(12) United States Patent
Bao et al.

(10) Patent No.: US 12,445,576 B2
(45) Date of Patent: Oct. 14, 2025

(54) INTERFACE DISPLAY METHOD, RELATED APPARATUS, DEVICE, AND READABLE STORAGE MEDIUM

(71) Applicant: Huawei Technologies Co., Ltd., Shenzhen (CN)

(72) Inventors: Xiuyuan Bao, Shenzhen (CN); Shuo Zhang, Beijing (CN); Chang Tang, Shenzhen (CN); Zhiming Fan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 193 days.

(21) Appl. No.: 18/556,548

(22) PCT Filed: Apr. 16, 2022

(86) PCT No.: PCT/CN2022/087242
§ 371 (c)(1),
(2) Date: Oct. 20, 2023

(87) PCT Pub. No.: WO2022/222872
PCT Pub. Date: Oct. 27, 2022

(65) Prior Publication Data
US 2024/0214523 A1   Jun. 27, 2024

(30) Foreign Application Priority Data
Apr. 20, 2021   (CN) .......................... 202110427045.7

(51) Int. Cl.
*H04N 7/15*   (2006.01)
*H04N 7/14*   (2006.01)

(52) U.S. Cl.
CPC ............. *H04N 7/152* (2013.01); *H04N 7/147* (2013.01)

(58) Field of Classification Search
CPC .......... H04N 7/152; H04N 7/147; H04N 7/15; H04N 7/14; G06F 3/0482; G06F 9/451; G06F 3/0483; G06F 3/04842
See application file for complete search history.

(56) References Cited

U.S. PATENT DOCUMENTS

| | | | |
|---|---|---|---|
| 10,880,315 B1 | 12/2020 | Carofiglio | |
| 2009/0282103 A1* | 11/2009 | Thakkar | ............. H04N 21/4314 709/204 |
| 2009/0322854 A1* | 12/2009 | Ellner | ...................... H04N 7/15 348/E7.083 |
| 2012/0127262 A1 | 5/2012 | Wu | |

(Continued)

FOREIGN PATENT DOCUMENTS

| | | |
|---|---|---|
| CN | 106063255 A | 10/2016 |
| CN | 109151367 A | 1/2019 |

*Primary Examiner* — Yosef K Laekemariam
(74) *Attorney, Agent, or Firm* — Conley Rose, P.C.

(57) ABSTRACT

An electronic device calculates an activeness ranking of all video call members based on factors such as a lasting time of a target sound intensity of a video call user within preset duration and an average value of sound intensities, and when a video call member in a non-display window is ranked higher than a video call member in a display window in the activeness ranking, interchanges the video call member in the non-display window with the video call member in the display window. A maximum interchange quantity L is set to limit a quantity of interchanges.

20 Claims, 12 Drawing Sheets

(56) References Cited

U.S. PATENT DOCUMENTS

| | | |
|---|---|---|
| 2016/0227165 A1 | 8/2016 | Moorjani |
| 2017/0149854 A1* | 5/2017 | Dove .................... H04N 7/147 |
| 2018/0203577 A1 | 7/2018 | Astavans |

* cited by examiner

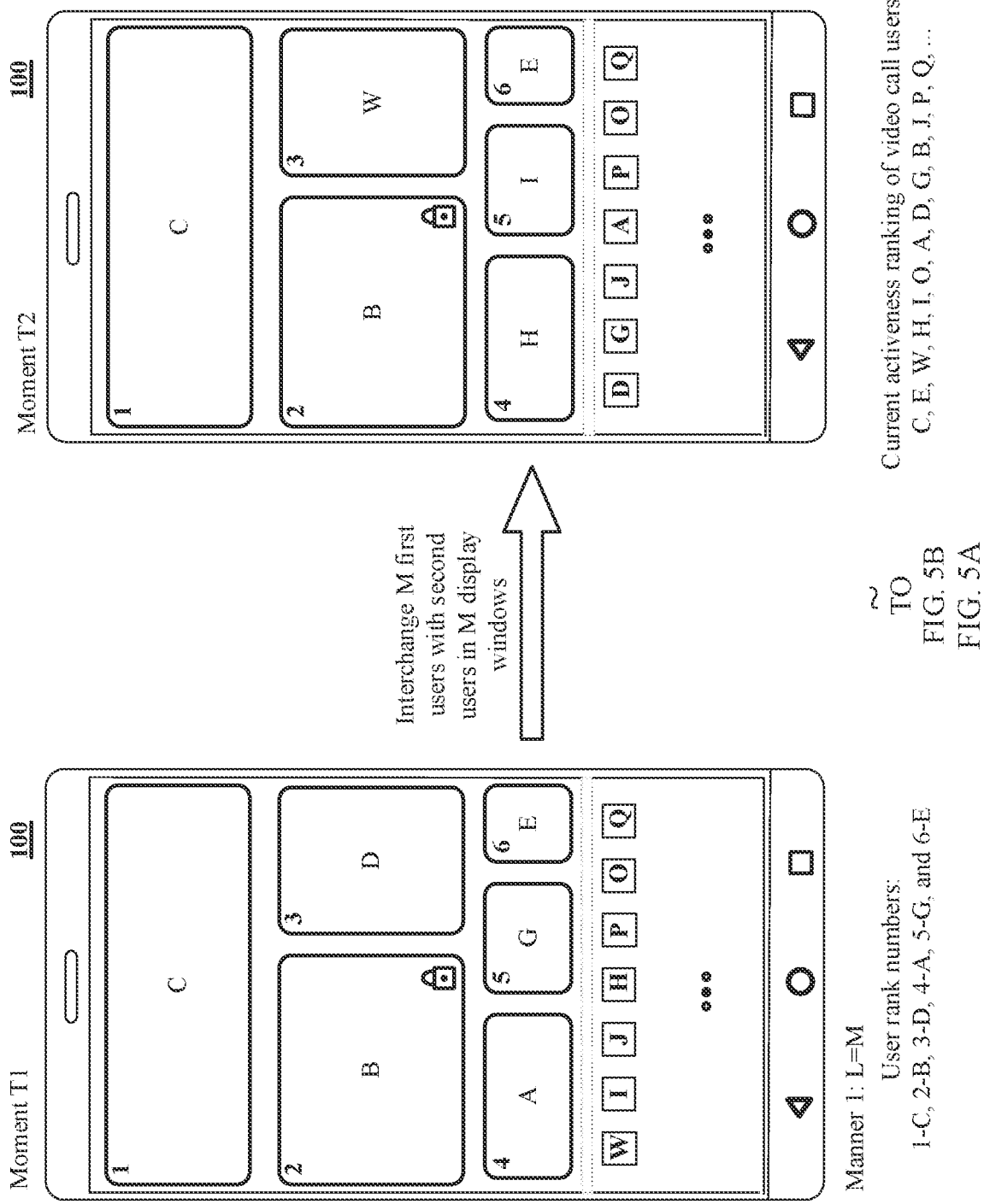

INTERFACE DISPLAY METHOD, RELATED APPARATUS, DEVICE, AND READABLE STORAGE MEDIUM

CROSS-REFERENCE TO RELATED APPLICATIONS

This application is a National Stage of International Patent Application No. PCT/CN2022/087242 filed on Apr. 16, 2022, which claims priority to Chinese Patent Application No. 202110427045.7 filed on Apr. 20, 2021. Both of the aforementioned applications are hereby incorporated by reference in their entireties.

TECHNICAL FIELD

This application relates to the field of interface display technologies, and in particular, to an interface display method, a related apparatus, a device, and a computer-readable storage medium.

BACKGROUND

Currently, many terminal products or social/conference applications provide joint video and voice chat functions for a plurality of members. In a multi-party call, due to a limitation of a screen size of a call device, a quantity of call members displayed on one screen is usually limited on the device by using a dynamic layout. To enable a user to completely view all call members, the user needs to flick the screen to view the members, or the device presents active members to the user through dynamic refresh. Currently, in a video call application, an interface of the video call application is mainly displayed in the following several manners. In a first manner, pictures of members are tiled on one interface of a user based on a fixed layout, and n members are displayed on one screen. When there are more than n call members, following members are displayed on a screen next to the first screen level by level until another n members are displayed, and so on. In a second manner, a method for providing a grid layout and a member list button is provided. A user may view all call members by expanding a member panel. In a third manner, a terminal device obtains sound intensities of members in a call, and preferentially displays a member with the highest sound intensity in a first screen picture or at a front location among all member pictures. In a fourth manner, a terminal device preferentially displays one member on an interface, the other members are displayed by using thumbnails, and a user views the other members by clicking the thumbnails.

With continuous development of a video call application, a problem increasingly concerned by a technical person is how to ensure that a great jump transition does not occur in an interface of a terminal device when it is ensured that a display window of an active user is displayed on the interface of the terminal device, so as to resolve a problem that transmission bandwidth of the terminal device and load of a cloud server are increased because of interface instability of the terminal device, which is caused by an excessively large quantity of display window interchanges.

SUMMARY

Embodiments of this application provide an interface display method, so as to resolve a problem that transmission bandwidth of an electronic device and load of a cloud server are increased caused by interface instability due to an excessively large quantity of display window interchanges.

According to a first aspect, an embodiment of this application provides an interface display method, including: An electronic device displays a video call screen of K users of current video call users by using K display windows; and the electronic device interchanges, based on a current activeness ranking of the video call users, M first users having changed ranks with second users in M display windows when a quantity of user rank changes reaches L. The quantity of user rank changes is a quantity of changes obtained by comparing user rank numbers of the K video call users with video call users that are ranked in the top K in the current activeness ranking. L is less than K, and M is less than or equal to L. The first user for interchange is ranked higher in the current activeness ranking than the corresponding interchanged second user. In this way, a maximum interchange quantity L of display windows is set to control a quantity of window interchanges, so that accuracy of matching between a display window and a user that is ranked higher in the current activeness ranking is ensured as much as possible, and a large jump transition of an electronic device interface caused by an excessively large quantity of display window interchanges is avoided, so as to avoid interface display instability, visual discomfort of a user, and bad user experience. In addition, an excessively large quantity of display window interchanges cause a large jump transition of the interface. As a result, bandwidth of a video stream in a transmission process is increased, and load of a cloud server is increased. The problem can be effectively resolved by setting the maximum interchange quantity L of display windows.

In a possible implementation, before the electronic device interchanges, based on a current activeness ranking of the video call users, M first users having changed ranks with second users in M display windows when a quantity of user rank changes reaches L, the method includes: The electronic device collects statistics about a lasting time of a target sound intensity of each video call user within preset duration and an average value of sound intensities of each video call user within the preset duration, where the target sound intensity is a sound intensity that is greater than a first threshold. The electronic device ranks the lasting time and ranks the average value, to obtain a rank value Rank1 and a rank value Rank2. The electronic device calculates a first rank value of each video call user in the preset duration based on the Rank1, the Rank2, a weight value of the Rank1, and a weight value of the Rank2. The electronic device calculates a current activeness score of each video call user based on the first rank value, a weight value of the preset duration, a second rank value of each video call user in historical preset duration, and a weight value of the historical preset duration. The electronic device ranks current activeness scores of the video call users, to obtain the current activeness ranking of the video call users. In this way, compared with the conventional technology in which the lasting time of the target sound intensity within the preset duration is used as a reference factor for the current activeness ranking of the video call users, the electronic device calculates the current activeness ranking of the users more comprehensively and accurately by using the lasting time of the target sound intensity of the user within the preset duration, the average value of the sound intensities of the user within the preset duration, and the second rank value of the user within the historical preset duration as reference factors for calculating the current activeness ranking of the users.

In a possible implementation, a value of L is [Ceil (K/3), Floor (K/2)]. Ceil (K/3) is a rounded-up integer of K/3, and Floor (K/2) is a rounded-down integer of K/2. In this way, when no more than L display windows in a user interface of the electronic device are interchanged, a user can feel a proper change of the display windows, and has no sense impact caused by a jump transition. This ensures that the user does not perceive an obvious change of the display windows, and ensures, as much as possible, accuracy of matching between a display window and a user that is ranked higher in the current activeness ranking.

In a possible implementation, the video call users are users satisfying an activeness ranking qualification. The activeness ranking qualification includes one or more of the following content: a video call user having only a video stream, a video call user having only an audio stream, a video call user having both a video stream and an audio stream, and a video call user having neither a video stream nor an audio stream. In this way, the electronic device can screen out a user that does not meet the activeness ranking qualification, so that a quantity of users for which the electronic device calculates the activeness ranking is reduced, and computing resources and storage resources of the electronic device are saved, thereby preventing working performance of the electronic device from being affected when excessive storage resources of the electronic device are occupied for calculating an activeness ranking of a large quantity of video call users.

In a possible implementation, that the electronic device interchanges, based on a current activeness ranking of the video call users, M first users having changed ranks with second users in M display windows when a quantity of user rank changes reaches L includes: When N users of the video call users in the K display windows are ranked beyond the top K in the current activeness ranking, and N is greater than or equal to M, the electronic device selects, from the N users, M users that are ranked lower in the current activeness ranking as the second users. The electronic device ranks the second users based on user rank numbers of the second users, to obtain second rank numbers of the second users. The electronic device selects, from video call users that are ranked in the top K in the current activeness ranking and that do not correspond to the K display windows, M users that are ranked higher in the current activeness ranking as the first users. The electronic device ranks the first users based on the current activeness ranking of the first users, to obtain first rank numbers of the first users. The electronic device interchanges the first users whose first rank numbers are the same as the second rank numbers with the second users. In this way, the electronic device interchanges the first users whose first rank numbers are the same as the second rank numbers with the second users, which helps to interchange a video call user that is ranked higher in the activeness ranking (a user whose first rank number is ranked higher) with a video call user corresponding to a display window whose user rank number is ranked higher (a user whose second rank number is ranked higher). When a size or a location of the display window is related to a user rank number, a video call user that is ranked higher in the activeness ranking may match a display window with a larger size or at a better location, so that a user participating in a video call can more easily obtain information about the video call user that is high in activeness, and user experience is improved.

In a possible implementation, the M display windows do not include a locked display window. In this way, the electronic device determines that a video call user in a locked display window is a user of concern of a user of the electronic device. The user of concern is not interchanged even if the user of concern is ranked beyond the top K in the current activeness ranking, so that the user of the electronic device may obtain information about the user of concern by using the display window, and user experience is improved.

In a possible implementation, before the electronic device interchanges, based on a current activeness ranking of the video call users, M first users having changed ranks with second users in M display windows when a quantity of user rank changes reaches L, the method includes: The electronic device adjusts a location of a third user in the current activeness ranking. The third user is a user, among the video call users in the K display windows, that is in a first state and that is ranked beyond the top K in the current activeness ranking, and the third user is ranked in the top K in an activeness ranking after adjustment. In this way, even if the third user is ranked beyond the top K in the current activeness ranking, the electronic device may adjust the location of the third user in the current activeness ranking, so that the third user is ranked in the top K, and the third user may be prevented from being not interchanged. Therefore, a user of the electronic device may obtain information about a member of concern (the third user) by using the display window, so that user experience is improved.

In a possible implementation, before the electronic device interchanges, based on a current activeness ranking of the video call users, M first users having changed ranks with second users in M display windows when a quantity of user rank changes reaches L, the method includes: The electronic device adjusts a location of a fourth user in the current activeness ranking. The fourth user is S users, among video call users that are ranked beyond the top K in the current activeness ranking and that do not correspond to the display windows, that are in a second state and that are ranked higher in the activeness ranking. S is less than or equal to M. and the fourth user is ranked in the top M in a current activeness ranking after adjustment. In this way, within the preset duration, if there is a video call user (the fourth user) that is high in activeness but is ranked beyond the top K in the current activeness ranking, the electronic device may predetermine, based on the activeness of the fourth user within the preset duration, that the fourth user is an active video call user within next preset duration, and grant a preferential interchange permission to the fourth user by adjusting the location of the fourth user in the activeness ranking, so that participation of the active user within the preset duration is improved.

In a possible implementation, that the electronic device interchanges, based on a current activeness ranking of the video call users. M first users having changed ranks with second users in M display windows when a quantity of user rank changes reaches L includes: If all the video call users in the K display windows are ranked in the top K in the current activeness ranking, and the quantity of user rank changes reaches L, the electronic device sets a sequence number i to 1. The electronic device selects a first video call user with a sequence number i and a second video call user with a sequence number i respectively from a first user sequence and a second user sequence. The first user sequence includes L video call users that are ranked higher in the current activeness ranking, the second user sequence includes L video call users whose sequence numbers are ranked higher in a user rank sequence, and the user rank sequence includes the video call users that are in the K display windows and that have user rank numbers. When user rank numbers of both the first video call user and the second video call user are not changed compared with the original user rank sequence, and the first video call user is ranked higher in the current activeness ranking than the second video call user, the electronic device interchanges locations of the first video call user and the second video call user in the user rank sequence, to obtain an updated user rank sequence. If a quantity of users whose user rank numbers are changed in the updated user rank sequence is greater than or equal to L, the electronic device interchanges M first users whose user rank numbers are changed in the updated user rank sequence with the second users in the corresponding M display windows. If the quantity of users whose user rank numbers are changed in the updated user rank sequence is less than L compared with the original user rank sequence, the electronic device updates the sequence number i based on a formula i=i+1, and performs the step that the electronic device selects a first video call user with a sequence number i and a second video call user with a sequence number i respectively from a first user sequence and a second user sequence. In this way, when the ranking of the users in the K display windows is changed, and the second users in the K display windows are ranked in the top K in the activeness ranking, the electronic device interchanges, as much as possible, a first user that is ranked higher in the activeness ranking with a second user that is ranked lower in the activeness ranking among the video call users whose user ranks are changed. When a size or a location of the display window is related to a user rank number, a video call user that is ranked higher in the activeness ranking may match a display window with a larger size or at a better location, so that a user participating in a video call can more easily obtain information about the video call user that is high in activeness, and user experience is improved.

In a possible implementation, that the electronic device interchanges, based on a current activeness ranking of the video call users, M first users having changed ranks with second users in M display windows when a quantity of user rank changes reaches L includes: If all the video call users in the K display windows are ranked in the top K in the current activeness ranking, and the quantity of user rank changes reaches L, the electronic device sets a sequence number i to 1. The electronic device selects a first video call user with a sequence number i and a third video call user with a sequence number i respectively from a first user sequence and a user rank sequence. The first user sequence includes L video call users that are ranked higher in the current activeness ranking, and the user rank sequence includes the video call users that are in the K display windows and that have user rank numbers. If the first video call user and the third video call user are different users, the electronic device interchanges locations of the first video call user and the third video call user in the user rank sequence, to obtain an updated user rank sequence. If a quantity of users whose user rank numbers are changed in the updated user rank sequence is greater than or equal to L, the electronic device interchanges M first users whose user rank numbers are changed in the updated user rank sequence with the second users in the M display windows. If the quantity of users whose user rank numbers are changed in the updated user rank sequence is less than L compared with the original user rank sequence, and the sequence number i is less than L, the electronic device updates the sequence number i based on a formula i=i+1, and performs the step that the electronic device selects a first video call user with a sequence number i and a third video call user with a sequence number i respectively from a first user sequence and a user rank sequence. In this way, when the ranking of the users in the K display windows is changed, and the second users in the K display windows are ranked in the top K in the activeness ranking, the electronic device interchanges, as much as possible, a first user that is ranked higher in the activeness ranking with a second user that is ranked lower in the activeness ranking among the video call users whose user ranks are changed. When a size or a location of the display window is related to a user rank number, a video call user that is ranked higher in the activeness ranking may match a display window with a larger size or at a better location, so that a user participating in a video call can more easily obtain information about the video call user that is high in activeness, and user experience is improved.

In a possible implementation, the first video call user and the second video call user do not include a video call user that is in a display window and that is in a third state. In this way, if the video call user in the third state is, for example, a video call user that is currently performing projection, the video call user in the third state does not participate in interchange, so that stability of a displayed interface of the video call user in the third state is ensured. This avoids a problem that user experience of a user of the electronic device is affected as a display window jump transition occurs due to a change of the video call user in the third state in a user ranking when the user of the electronic device obtains information displayed by using a display window of the video call user in the third state.

In a possible implementation, the first video call user and the third video call user do not include a video call user that is in a display window and that is in a third state. In this way, if the video call user in the third state is, for example, a video call user that is currently performing projection, the video call user in the third state does not participate in interchange, so that stability of a displayed interface of the video call user in the third state is ensured. This avoids a problem that user experience of a user of the electronic device is affected as a display window jump transition occurs due to a change of the video call user in the third state in a user ranking when the user of the electronic device obtains information displayed by using a display window of the video call user in the third state.

According to a second aspect, an embodiment of this application provides an interface display apparatus. The interface display apparatus includes:
 a display unit, configured to display a video call screen of K users of current video call users by using K display windows;
 a first determining unit, configured to determine, based on a current activeness ranking of the video call users, whether a quantity of user rank changes reaches L; and
 an interchanging unit, configured to: when the first determining unit determines that the quantity of user rank changes reaches L, interchange M first users having changed ranks with second users in M display windows.

In a possible implementation, the interface display apparatus further includes:
 a statistics collection unit, configured to collect statistics about a lasting time of a target sound intensity of each video call user within preset duration and an average value of sound intensities of each video call user within the preset duration;
 a ranking unit, configured to rank the lasting time and rank the average value, to obtain a rank value Rank1 and a rank value Rank2;

a first calculation unit, configured to calculate, based on the first rank value, the weight value of the preset duration, the second rank value of each video call user in the historical preset duration, and the weight value of the historical preset duration, a current activeness score of each video call user; and a second calculation unit, configured to rank current activeness scores of the video call users, to obtain the current activeness ranking of the video call users.

In a possible implementation, the interchanging unit includes:

a second determining unit, configured to determine whether there are N users that are of the video call users in the K display windows and that are ranked beyond the top K in the current activeness ranking, a third determining unit, configured to: when the first determining unit determines that there are N users that are of the video call users in the K display windows and that are ranked beyond the top K in the current activeness ranking, determine whether N is greater than or equal to M;

a second user selection unit, configured to: when the second determining unit determines that N is greater than or equal to M, select, from the N users, M users that are ranked lower in the current activeness ranking as the second users;

a second rank number generation unit, configured to rank the second users based on user rank numbers of the second users, to obtain second rank numbers of the second users;

a first user selection unit, configured to select, from video call users that are ranked in the top K in the current activeness ranking and that do not correspond to the K display windows, M users that are ranked higher in the current activeness ranking as the first users;

a first rank number generation unit, configured to rank the first users based on the current activeness ranking of the first users, to obtain first rank numbers of the first users; and a first execution unit, configured to interchange the first users whose first rank numbers are the same as the second rank numbers with the second users.

In a possible implementation, the interface display apparatus further includes:

a first adjustment unit, configured to: before the interchanging unit interchanges the M first users having changed ranks with the second users in the M display windows, adjust a location of a third user in the current activeness ranking.

In a possible implementation, the interface display apparatus further includes:

a second adjustment unit, configured to: before the interchanging unit interchanges the M first users having changed ranks with the second users in the M display windows, adjust a location of a fourth user in the current activeness ranking.

In a possible implementation, the interchanging unit further includes:

a fourth determining unit, configured to determine whether all the video call users in the K display windows are ranked in the top K in the current activeness ranking;

a fifth determining unit, configured to: when the fourth determining unit determines that all the video call users in the K display windows are ranked in the top K in the current activeness ranking, determine whether the quantity of user rank changes reaches L;

a sequence number setting unit, configured to set a sequence number i to 1 when the fifth determining unit determines that the quantity of user rank changes reaches L;

a first selection unit, configured to select a first video call user with a sequence number i from a first user sequence;

a second selection unit, configured to select a second video call user with a sequence number i from the second user sequence;

a sixth determining unit, configured to determine whether user rank numbers of both the first video call user and the second video call user are changed compared with an original user rank sequence;

a seventh determining unit, configured to: when the sixth determining unit determines that the user rank numbers of both the first video call user and the second video call user are not changed compared with the original user rank sequence, determine whether the first video call user is ranked higher in the current activeness ranking than the second video call user;

a first updating unit, configured to: when the seventh determining unit determines that the first video call user is ranked higher in the current activeness ranking than the second video call user, interchange locations of the first video call user and the second video call user in the user rank sequence, to obtain an updated user rank sequence;

an eighth determining unit, configured to determine whether a quantity of users whose user rank numbers are changed in the updated user rank sequence is greater than or equal to L compared with the original user rank sequence;

a second execution unit, configured to: when the eighth determining unit determines that the quantity of users whose user rank numbers are changed in the updated user rank sequence is greater than or equal to L compared with the original user rank sequence, interchange M first users whose sequence numbers are changed in the updated user rank sequence with the second users in the M display windows; and a first sequence number updating unit, configured to update the sequence number i based on a formula i=i+1 when the eighth determining unit determines that the quantity of users whose user rank numbers are changed in the updated user rank sequence is less than L compared with the original user rank sequence.

In a possible implementation, the interchanging unit further includes:

a third selecting unit, configured to select a second video call user with a sequence number i from the user rank sequence;

a ninth determining unit, configured to determine whether the first video call user with a sequence number i and the third video call user with a sequence number i are a same user;

a second updating unit, configured to: when the ninth determining unit determines that the first video call user with the sequence number i and the third video call user with the sequence number i are different users, interchange locations of the first video call user and the third video call user in the user rank sequence, to obtain an updated user rank sequence;

a tenth determining unit, configured to determine whether a quantity of users whose user rank numbers are changed in the updated user rank sequence compared with an original user rank sequence is greater than or equal to L;

a third execution unit, configured to: when the tenth determining unit determines that the quantity of users whose user rank numbers are changed in the updated user rank sequence compared with the original user rank sequence is greater than or equal to L, interchange M first users whose sequence numbers are changed in the updated user rank sequence with the second users in the M display windows; and a second rank number updating unit, configured to: when the tenth determining unit determines that the quantity of users whose user rank numbers are changed in the updated user rank sequence compared with the original user rank sequence is greater than or equal to L, and the sequence number i is less than L, update the sequence number i based on a formula i=i+1.

According to a third aspect, an embodiment of this application provides an electronic device, including a memory, a processor, and a touchscreen.

The touchscreen is configured to display content.

The memory is configured to store a computer program, and the computer program includes program instructions.

The processor is configured to invoke the program code stored in the memory, to perform the following steps:

instructing the touchscreen to display, by using K display windows, a video call screen of K users of current video call users;

determining, based on a current activeness ranking of the video call users, whether a quantity of user rank changes reaches L; and if it is determined that the quantity of user rank changes reaches L, interchanging M first users having changed ranks with second users in M display windows.

In a possible implementation, before the processor interchanges the M first users having changed ranks with the second users in the M display windows, the following steps are included:

collecting statistics about a lasting time of a target sound intensity of each video call user within preset duration and an average value of sound intensities of each video call user within the preset duration;

ranking the lasting time and ranking the average value, to obtain a rank value Rank1 and a rank value Rank2;

calculating a first rank value of each video call user within the preset duration based on the Rank1, the Rank2, a weight value of the Rank1, and a weight value of the Rank2;

calculating a current activeness score of each video call user based on the first rank value, a weight value of the preset duration, a second rank value of each video call user in historical preset duration, and a weight value of the historical preset duration; and ranking current activeness scores of the video call users, to obtain the current activeness ranking of the video call users.

In a possible implementation, that the processor interchanges M first users having changed ranks with second users in M display windows includes:

determining whether there are N users that are of the video call users in the K display windows and that are ranked beyond the top K in the current activeness ranking, where N is greater than 0;

if it is determined that there are N users that are of the video call users in the K display windows and that are ranked beyond the top K in the current activeness ranking, determining whether N is greater than or equal to M;

if it is determined that N is greater than or equal to M, selecting M users that are ranked lower in the current activeness ranking as the second users;

ranking the second users based on user rank numbers of the second users, to obtain second rank numbers of the second users;

selecting, from video call users that are ranked in the top K in the current activeness ranking and that do not correspond to the K display windows, M users that are ranked higher in the current activeness ranking as the first users;

ranking the first users based on the current activeness ranking of the first users, to obtain first rank numbers of the first users; and interchanging the first users whose first rank numbers are the same as the second rank numbers with the second users.

In a possible implementation, before the processor interchanges the M first users having changed ranks with the second users in the M display windows, the following step is included:

adjusting a location of a third user in the current activeness ranking.

In a possible implementation, before the processor interchanges the M first users having changed ranks with the second users in the M display windows, the following step is included:

adjusting a location of a fourth user in the current activeness ranking.

In a possible implementation, that the processor interchanges M first users having changed ranks with second users in M display windows includes:

determining whether all the video call users in the K display windows are ranked in the top K in the current activeness ranking;

if it is determined that all the video call users in the K display windows are ranked in the top K in the current activeness ranking, determining whether the quantity of user rank changes of the video call users in the K display windows reaches L;

if it is determined that the quantity of user rank changes of the video call users in the K display windows reaches L, setting a sequence number i to 1;

selecting a first video call user with a sequence number i and a second video call user with a sequence number i respectively from a first user sequence and a second user sequence;

determining whether user rank numbers of both the first video call user and the second video call user are changed compared with an original user rank sequence;

if it is determined that the user rank numbers of both the first video call user and the second video call user are not changed compared with the original user rank sequence, determining whether the first video call user is ranked higher in the current activeness ranking than the second video call user;

if it is determined that the first video call user is ranked higher in the current activeness ranking than the second video call user, interchanging locations of the first video call user and the second video call user in the user rank sequence, to obtain an updated user rank sequence;

determining whether a quantity of users whose user rank numbers are changed in the updated user rank sequence is greater than or equal to L compared with the original user rank sequence;

if it is determined that the quantity of users whose user rank numbers are changed in the updated user rank sequence is greater than or equal to L compared with the original user rank sequence, interchanging M first users whose sequence numbers are changed in the updated user rank sequence with the second users in the M display windows; and if it is determined that the quantity of users whose user rank numbers are changed in the updated user rank sequence is less than L compared with the original user rank sequence, updating the sequence number i based on a formula i=i+1, and performing the step that the processor selects a first video call user with a sequence number i and a second video call user with a sequence number i respectively from a first user sequence and a second user sequence.

In a possible implementation, that the processor interchanges M first users having changed ranks with second users in M display windows includes:

determining whether all the video call users in the K display windows are ranked in the top K in the current activeness ranking;

if it is determined that all the video call users in the K display windows are ranked in the top K in the current activeness ranking, determining whether the quantity of user rank changes of the video call users in the K display windows reaches L;

if it is determined that the quantity of user rank changes of the video call users in the K display windows reaches L, setting a sequence number i to 1;

selecting a first video call user with a sequence number i and a second video call user with a sequence number i respectively from a first user sequence and a user rank sequence;

determining whether the first video call user and the third video call user are a same user;

if it is determined that the first video call user and the third video call user are different users, interchanging locations of the first video call user and the third video call user in the user rank sequence, to obtain an updated user rank sequence;

determining whether a quantity of users whose user rank numbers are changed in the updated user rank sequence is greater than or equal to L compared with the original user rank sequence;

if it is determined that the quantity of users whose user rank numbers are changed in the updated user rank sequence is greater than or equal to L compared with the original user rank sequence, interchanging M first users whose sequence numbers are changed in the updated user rank sequence with the second users in the M display windows;

if it is determined that the quantity of users whose user rank numbers are changed in the updated user rank sequence is less than L compared with the original user rank sequence, determining whether the sequence number i is less than L;

if it is determined that the sequence number i is less than L, updating the sequence number i based on a formula i=i+1, and performing the step that the electronic device selects a first video call user with a sequence number i and a third video call user with a sequence number i respectively from a first user sequence and a user rank sequence; and if it is determined that the sequence number i is greater than or equal to L, interchanging M first users whose sequence numbers are changed in the updated user rank sequence with the second users in the M display windows.

According to a fourth aspect, an embodiment of this application provides a computer-readable storage medium. The computer-readable storage medium stores a computer program. When the computer program is executed by a processor, the interface display method in the first aspect and the possible implementations of the first aspect is implemented.

According to a fifth aspect, an embodiment of this application provides a computer program. The computer program includes instructions. When the computer program is executed by a computer, an electronic device may perform the procedure performed by the electronic device in the first aspect and the possible implementations of the first aspect.

According to a sixth aspect, an embodiment of this application provides a chip system. The chip system includes a processor, configured to support an electronic device in implementing functions in the method in the first aspect and the possible manners of the first aspect.

In a possible design, the chip system further includes a memory. The memory is configured to store program instructions and data that are necessary for the electronic device. The chip system may include a chip, or may include a chip and another discrete device.

BRIEF DESCRIPTION OF DRAWINGS

The following describes the accompanying drawings used in embodiments of this application.

FIG. 5A and FIG. 5B are a diagram of another interface on which users in display windows are interchanged according to an embodiment of this application;

DESCRIPTION OF EMBODIMENTS

Figure 1:
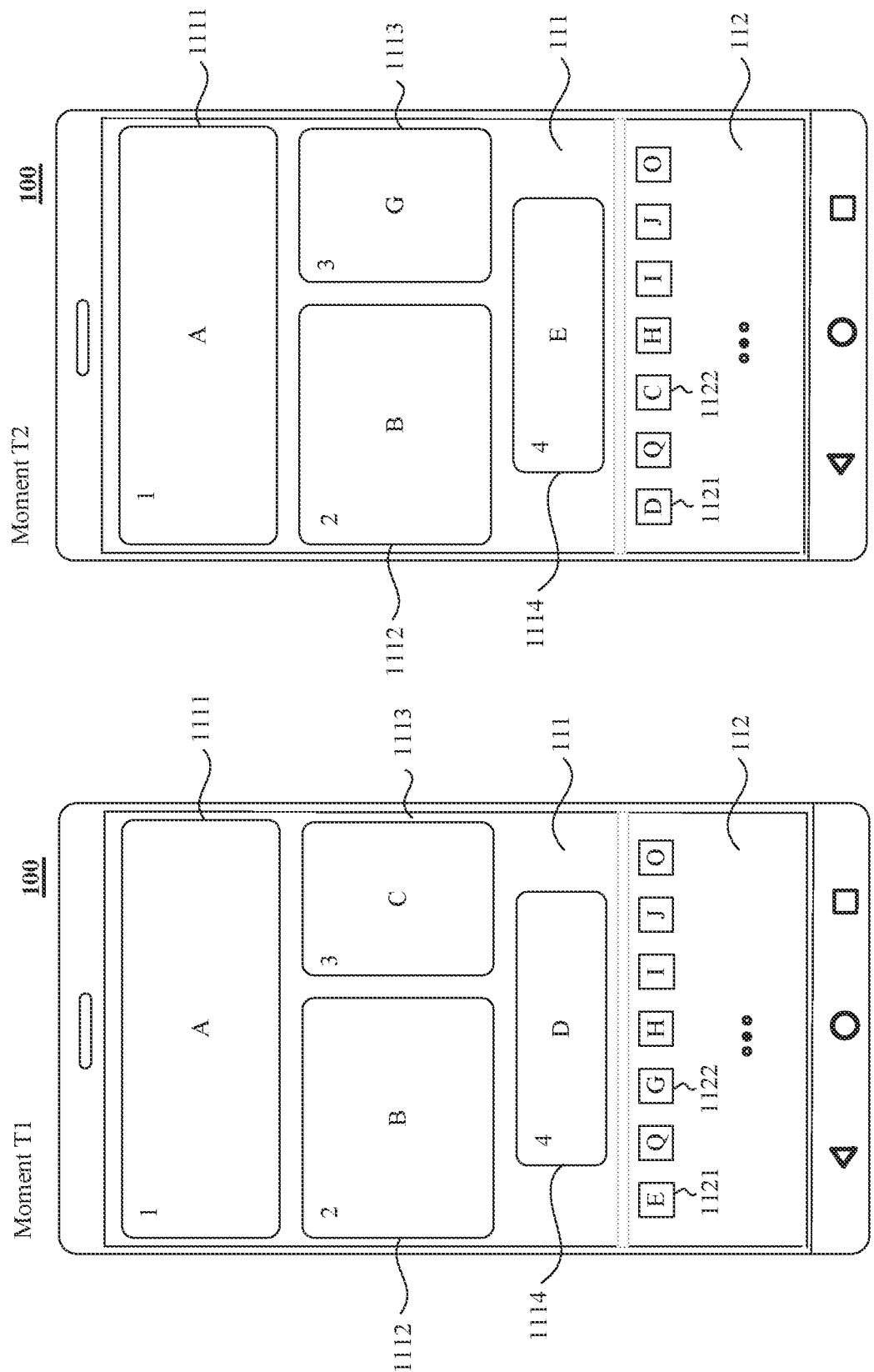
FIG. 1 is a schematic diagram of a scenario of interface display according to an embodiment of this application.

The following clearly and completely describes the technical solutions in embodiments of this application with reference to the accompanying drawings in embodiments of this application. It is clear that the described embodiments are merely some but not all of embodiments of this application. An "embodiment" mentioned in this specification means that a particular feature, structure, or characteristic described with reference to this embodiment may be included in at least one embodiment of this application. The phrase shown in various locations in this specification may not necessarily refer to a same embodiment, and is not an independent or optional embodiment exclusive from another embodiment. It is explicitly and implicitly understood by a person skilled in the art that embodiments described in this specification may be combined with another embodiment. All other embodiments obtained by a person of ordinary skill in the art based on embodiments of this application without creative efforts shall fall within the protection scope of this application.

In this specification, claims, and accompanying drawings of this application, the terms "first", "second", "third", and the like are intended to distinguish between different objects but do not indicate a particular order. In addition, terms "include", "have", or any other variant thereof are intended to cover a non-exclusive inclusion. For example, a series of steps or units are included, or optionally, steps or units that are not listed are further included, or optionally, other inherent steps or units of these processes, methods, products, or devices are further included.

The accompanying drawings show only a part rather than all content related to this application. Before discussing the example embodiments in more detail, it should be mentioned that some example embodiments are described as processing or methods depicted as flowcharts. Although the flowchart describes the operations as sequential processing, many of these operations can be implemented in parallel, concurrently, or simultaneously. In addition, the sequence of the operations may be rearranged. The processing may be terminated when the operation is completed, but may further have additional steps that are not included in the figures. The processing may correspond to a method, a function, a procedure, a subroutine, a subprogram, or the like.

Terminologies such as "component", "module", "system" and "unit" used in this specification are used to indicate computer-related entities, hardware, firmware, combinations of hardware and software, software, or software being executed. For example, the unit may be, but is not limited to, a process running on a processor, a processor, an object, an executable file, an execution thread, a program, and/or distributed between two or more computers. In addition, these units may be executed from various computer-readable media that store various data structures. For example, the units may communicate by using a local and/or remote process and according to, for example, a signal having one or more data packets (for example, data from a second unit interacting with another unit in a local system, a distributed system, and/or across a network such as the Internet interacting with other systems by using the signal).

FIG. 1 is a schematic diagram of a scenario of interface display according to an embodiment of this application. As shown in FIG. 1, a displayed interface of a terminal device 100 is a multi-party video session interface, and the displayed interface 110 is divided into an unstable region 111 and a stable region 112. There are multiple display windows (only four are listed in FIG. 1) in the unstable region 111, and video call users corresponding to the display windows are A, B, C, and D. There are thumbnails (only seven are listed in FIG. 1) of multiple users in the stable region 112, and users corresponding to the thumbnails are E, Q, G, H, I, J and O. After the terminal device 100 detects an input operation (for example, flicking left or flicking right) on the stable region 112, the terminal device 100 responds to the operation, the stable region 112 displays a next interface, a thumbnail of another video call user is displayed on the next interface, and the unstable region 111 remains unchanged.

At a moment T1, the video call users in the display windows in the unstable region are A, B, C, and D. After preset duration, the terminal device 100 calculates an activeness ranking of the video call users in the preset duration, and replaces a video call user in a corresponding display window in the unstable region 111 based on the activeness ranking of the users. At a moment T2, an activeness ranking of the users participating in a video call is G, A, E, O, Q, B, D, C, H, I, J, . . . , and video call users in some display windows in the unstable region 111 are ranked beyond the top four in the current activeness ranking. Therefore, in the unstable region 111, the video call users in some display windows are interchanged with some video call users in the stable region. To be specific, the user C is interchanged with the user G, and a user in a display window 1113 is changed to the user G; the user D is interchanged with the user E, and a user in a display window 1114 is changed to the user E; and a user corresponding to a thumbnail 1121 is changed to the user D, and a user corresponding to a thumbnail 1122 is changed to the user C.

Figure 2:
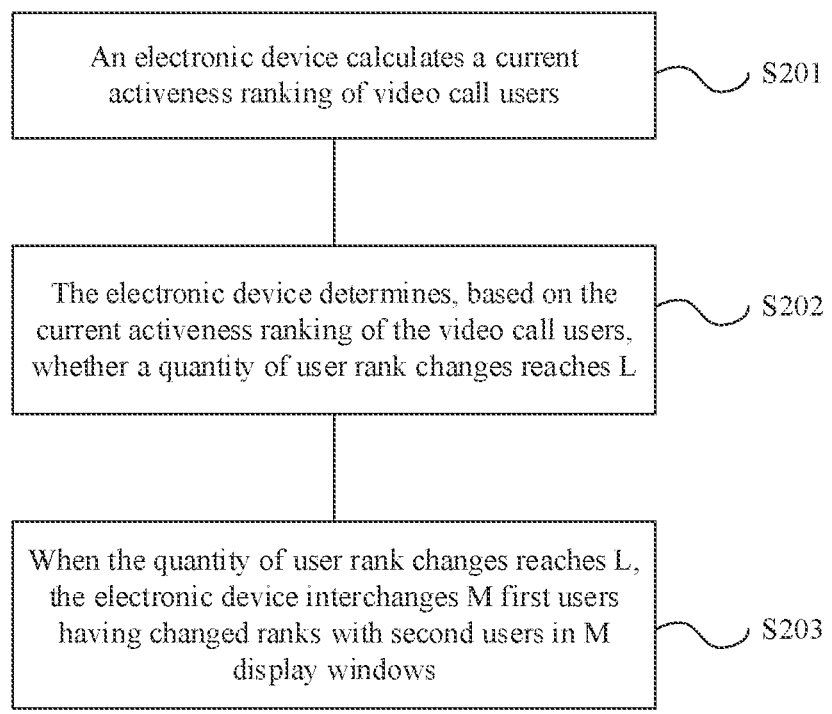
FIG. 2 is a flowchart of user interchanges on an interface according to an embodiment of this application.

In the embodiment in FIG. 1, a process of interchanging a user in the stable region with an unstable user is described in detail in embodiments of this application with reference to the accompanying drawings. FIG. 2 is a flowchart of user interchanges on an interface according to an embodiment of this application. In FIG. 2, a video call user corresponding to a display window may be a video call user corresponding to a display window in the unstable region in the embodiment in FIG. 1, and a video call user that does not correspond to a display window may be a video call user corresponding to a thumbnail in the stable region in the embodiment in FIG. 1. An example in which a terminal device is an electronic device is used for description in this embodiment of this application. The following describes in detail a process of video call user interchanges on the interface with reference to FIG. 2.

Step S201: The electronic device calculates a current activeness ranking of video call users.

Specifically, a specific manner for calculating the activeness ranking is as follows: The electronic device collects statistics about a lasting time of a target sound intensity of each video call user and an average value of sound intensities in current preset duration. The target sound intensity is an average value of decibel greater than a first threshold. The first threshold may be set based on an empirical value. This is merely an example for description in this embodiment of this application, and does not constitute a limitation. Then, the electronic device ranks the video call members based on the lasting time of the target sound intensity within the preset duration, to obtain a rank value Rank1 of each video call member; and ranks the video call members based on the average value of the sound intensities within the preset duration, to obtain a rank value Rank2 of each video call member. The electronic device may obtain a first rank value of each video call member within the preset duration based on a formula $P1=Rank1*W_{r1}+Rank2*W_{r2}$. P1 is the first rank value, $W_{r1}$ is a weight value of the Rank1, $W_{r2}$ is a weight value of the Rank2, and $W_{r1}+W_{r2}=1$. Then, the electronic device may obtain an activeness score of each video call member within the preset duration based on a formula $F=P1*W_{t1}+P2*W_{t2}+\ldots+Pi*W_{tt}$. F is the activeness score of the video call member, $W_{tt}$ is a weight value of historical preset duration, Pi is a second rank value of the video call member within the historical preset duration, and $W_{t1}+W_{t2}+\ldots+W_{tt}=1$. For a formula for calculating the second rank value, refer to the formula for calculating the first rank value. This is not limited in this embodiment of this application. The electronic device ranks F of all video call members, so as to obtain a current activeness ranking R of the video call members.

It should be noted that, in addition to the lasting time of the target sound intensity and the average value of the sound intensities of each video call user within the preset duration, the electronic device may further pick up and collect statistics about factors that affect the activeness ranking of a user in the video call, for example, factors such as a lasting time of a video stream of each video call user within the preset duration and quality and stability of the video stream of each video call member, and rank these factors to obtain a corresponding rank value Rank_n. Then, the first rank value of each video call member in the preset duration is obtained based on a formula $P1=Rank1*W_{r1}+Rank2*W_{r2}+\ldots+Rank\_n*W_{rn}$. $W_{rn}$ is a weight value corresponding to Rank_n, and $W_{r1}+W_{r2}+\ldots+W_{rn}=1$. The more statistics that are about factors affecting the activeness ranking of the users in the video call and that are picked up and collected by the electronic device, the more comprehensive and accurate the current activeness ranking of the video users obtained by the electronic device.

In a possible implementation, before calculating the current activeness ranking of the video call users, the electronic device reviews a ranking qualification of the video call users. The electronic device calculates the activeness ranking for a video call user only when the video call user meets an activeness ranking qualification. The activeness ranking qualification includes one or more of the following content; a video call user having only a video stream, a video call user having only an audio stream, a video call user having both a video stream and an audio stream, and a video call user having neither a video stream nor an audio stream. The audio stream includes but is not limited to microphone audio and media audio that are picked up by the electronic device, and the video stream includes but is not limited to pictures such as a camera picture, a media picture, and a user screen that are picked up. The electronic device may screen out some video call users that do not meet the activeness ranking qualification by reviewing the ranking qualification of the video call users, to prevent working performance of the electronic device from being affected when excessive computing resources of the electronic device are occupied for calculating the activeness ranking of the video call users. For example, if the electronic device focuses more on determining, based on a video stream and an audio stream of a video call member, whether the video call member is active, the electronic device calculates the activeness ranking only for the video call user having both the video stream and the audio stream, so that computing resources of the electronic device are saved to some extent.

Step S202: The electronic device determines, based on the current activeness ranking of the video call users, whether a quantity of user rank changes reaches L.

Specifically, there are K display windows in a display area of the electronic device, and the display windows are used to display users (active users) that are of the video call users and that are relatively high in current activeness. For example, the display windows may be the display windows in the unstable region 111 in the embodiment in FIG. 1, and shapes and sizes of the display windows may be the same, or may be different. This is merely an example for description in this embodiment of this application, and does not constitute a limitation. The quantity of user rank changes is a quantity of changes obtained by comparing user rank numbers of the K video call users with video call users that are ranked in the top K in the current activeness ranking. The user rank number may be identifier information (for example, a mark number of a display window) of the display window. For example, in the embodiment of FIG. 1, an electronic device 100 may obtain user rank numbers of the users A, B, C, and D at the moment T1 based on mark numbers of the display windows, that is, 1-user A, 2-user B, 3-user C, and 4-user D. This is merely an example for description in this embodiment of this application, and does not constitute a limitation. The electronic device compares whether the user rank numbers of the K video call users in the display windows are consistent with the current activeness ranking of the K video call users. If the user rank numbers of the K video call users in the display windows are consistent with the current activeness ranking of the K video call users, the electronic device does not perform any operation. If the user rank numbers of the K video call users in the display windows are inconsistent with the current activeness ranking of the K video call users, the electronic device determines whether the quantity of user rank changes of the video call users reaches L, where L is a maximum quantity of display windows that can be replaced. The quantity of user rank changes is the quantity of changes obtained by comparing the user rank numbers of the K video call users with the video call users that are ranked in the top K in the current activeness ranking. A value range of L may be [Ceil (K/3), Floor (K/2)], where Ceil (K/3) is a rounded-up integer of K/3, and Floor (K/2) is a rounded-down integer of K/2. In actual experience, when an interchange takes place in more than half of the display windows on the user interface, the user perceives obvious instability and an obvious jump transition of the interface. When the interchange takes place in about one-third of the display windows on the user interface, the user can feel a proper change of the display windows, and has no sense impact caused by the jump transition. Therefore, to ensure accuracy of as many active members as possible when the user does not perceive an obvious change of the display windows, the value range of L is set to [Ceil (K/3), Floor (K/2)] (L is an integer). If the quantity N of the user rank changes is less than L, the electronic device interchanges N first users having changed ranks with second users in corresponding N display windows.

Figure 3:
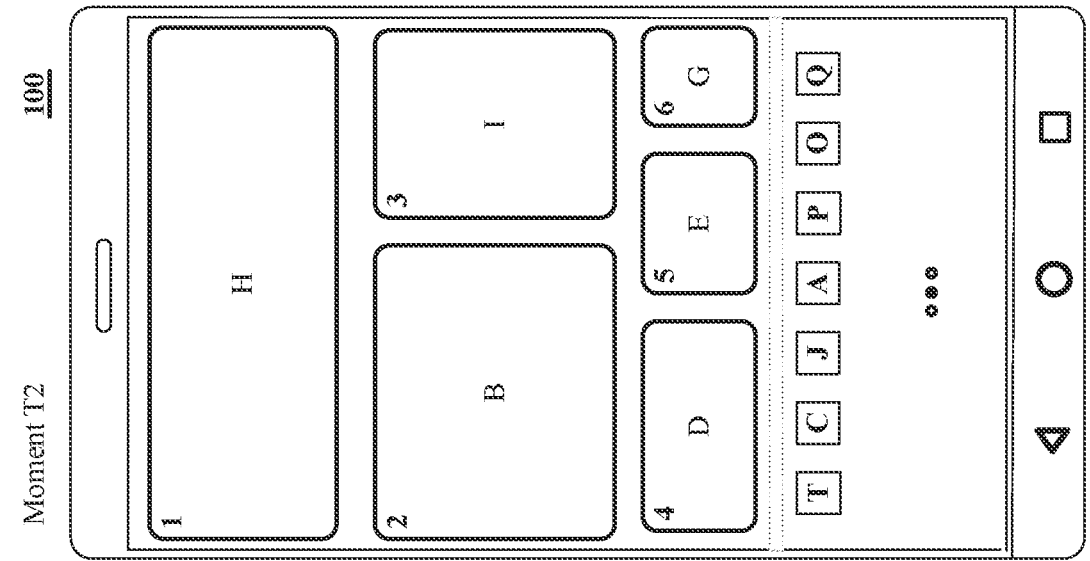
FIG. 3 is a diagram of an interface on which users in display windows are interchanged according to an embodiment of this application.
Figure 3:
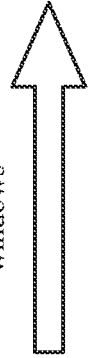
Figure 3:
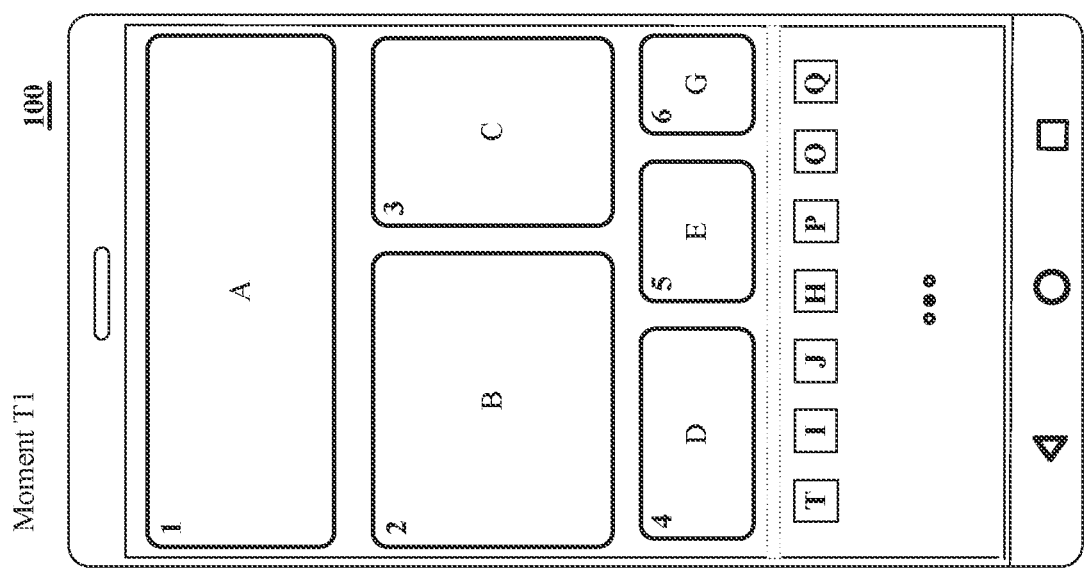

For example, the interchange of the N first users with the second users in the corresponding N display windows may be shown in FIG. 3. There are six display windows in FIG. 3, and corresponding video call users are A, B, C, D, E and G. Based on identifier information of the display windows (mark numbers of the display windows in FIG. 3), user rank numbers (1-A, 2-B, 3-C, 4-D, 5-E, and 6-G) corresponding to the users in the display windows may be obtained. If a current activeness ranking of video call users is 1-H, 2-B, 3-I, 4-D, 5-E, 6-G, 7-A, 8-C, 9-J, . . . , L may be assumed to be 3 based on the foregoing setting rule of L. The user rank numbers of the video call users are compared with the current activeness ranking of the video call users, and it can be learned that the quantity of user rank changes is 2 (N<L, and the users A and C are ranked beyond the top six in the current activeness ranking). At a moment T2, the electronic device 100 may directly interchange the user H with the user A, and interchange the user I with the user C.

Step S203. When the quantity of user rank changes reaches L, the electronic device interchanges M first users having changed ranks with second users in M display windows.

Specifically, the second users are video call users that are to be interchanged and that are corresponding to display windows, and the quantity of user rank changes may be understood as a quantity N of users that are of the video call users in the K display windows and that are ranked beyond the top K in the current activeness ranking. If the quantity N of users is greater than or equal to L, M second users that are ranked beyond the top K in the current activeness ranking are interchanged, so as to enable video call users that are ranked higher in the activeness ranking to occupy display windows as much as possible, so that a video call user can more easily obtain information displayed by active video call members, to improve communication efficiency of the video call users. In addition, setting the maximum interchange quantity L of the display windows helps to prevent an excessively large quantity of display window interchanges caused by an excessively large quantity of user rank changes, which causes instability of a displayed interface of the electronic device and uncomfortable visual perception of the user. Further, if there are an excessively large quantity of display window interchanges, the electronic device needs to occupy relatively large bandwidth when transmitting data such as a video stream of the display windows, which wastes bandwidth resources and causes extra load to a cloud server to some extent. A specific process in which the second users are interchanged may include the following five cases.

In a first case, the electronic device ranks, based on current activeness, users that are of the video call users in the K display windows and that are ranked beyond the top K in the current activeness ranking, and selects M (M is greater than or equal to L, and M=L is used as an example for description in this embodiment of this application) users that are ranked lower in the current activeness ranking as video call users to be replaced (second users). The electronic device ranks the M second users based on user rank numbers (identifiers of display windows corresponding to the second users, for example, mark numbers of the display windows) of the M second users, to obtain a second rank number of each second user. Then, the electronic device ranks, based on a current activeness ranking, video call users that are ranked in the top K in the current activeness ranking and that do not correspond to the display windows, to obtain M users (first users) that are ranked higher in the current activeness ranking. The electronic device obtains a first rank number of each first user based on the current activeness ranking of the first users. Then, the electronic device interchanges the first users whose first rank numbers are the same as the second rank numbers with the second users. When the quantity N of users is greater than or equal to L, a value of M may be L. When the quantity N of users is less than L, the value of M may be N.

Figure 4:
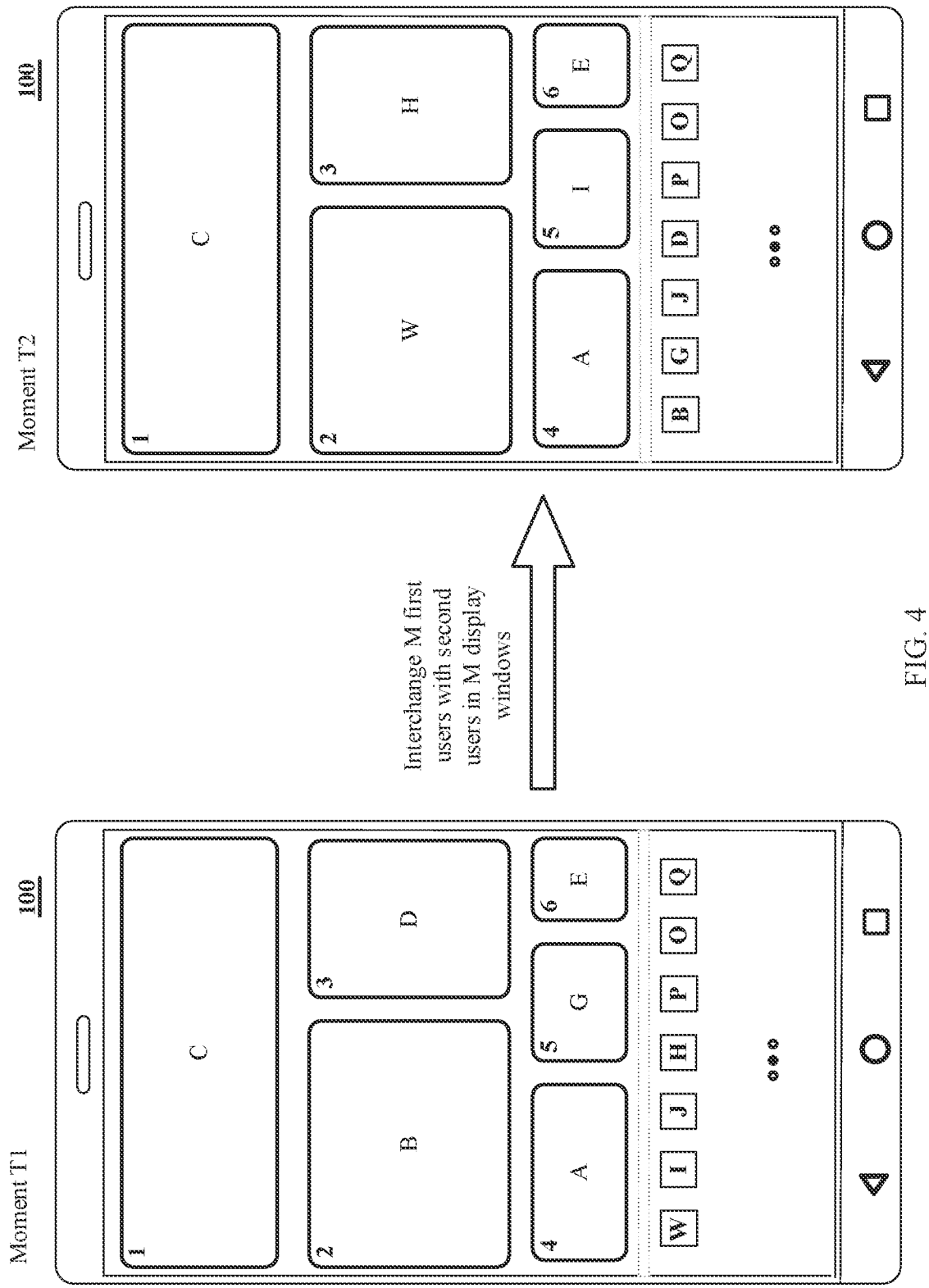
FIG. 4 is a diagram of another interface on which users in display windows are interchanged according to an embodiment of this application.

For example, as shown in FIG. 4, the electronic device 100 has six display windows. Based on the foregoing value setting rule of L, L may be assumed to be 3. Users in the display windows of the electronic device 100 at a moment T1 are C, B, D, A, G and E. Mark numbers of the display windows are corresponding to the users, and user rank numbers of C, B, D, A, G and E may respectively be 1-C, 2-B, 3-D, 4-A, 5-G and 6-E. The electronic device 100 obtains an activeness ranking 1-C, 2-B, 3-W, 4-H, 5-I, 6-O, 7-A, 8-D, 9-G, 10-B, 11-J, 12-P, 13-Q, and so on of users participating in a video call at a current moment (a moment T2). The electronic device 100 compares the user rank numbers with the current activeness ranking of the users, and the users A, D, G, and B are ranked beyond the top six in the activeness ranking, and L is equal to 3. Therefore, three users are selected from A, D, G, and B as users to be replaced (second users). The electronic device 100 ranks the users A, D, G, and B based on the current activeness ranking. Because the users D, G, and B are ranked lower in the current activeness ranking, the electronic device 100 determines that the users D. G, and B are the second users to be interchanged, and ranks the users based on the user rank numbers of the three second users, to obtain second rank numbers of the users D, G, and B: 1-B, 2-D, and 3-G (a rule for setting the second rank numbers in this embodiment of this application is: When a user rank number is ranked higher, a second rank number is ranked higher. The rule for setting the second rank numbers is merely an example for description in this embodiment of this application, and does not constitute a limitation). The electronic device 100 selects, from video call users (users W, H, I, and O) that are ranked in the top six in the current activeness ranking and that do not correspond to the display windows, three users that are ranked higher in the current activeness ranking as first users (users W, H, and I) to be interchanged with the second users, and ranks the first users based on the current activeness ranking of the users, to obtain first rank numbers of the first users: 1-W, 2-H, and 3-I (a rule for setting the first rank numbers in this embodiment of this application is: When a user rank number is ranked higher, a first rank number is ranked higher. The rule for setting the first rank numbers is merely an example for description in this embodiment of this application, and does not constitute a limitation). Then, the electronic device 100 interchanges the first users whose first rank numbers are the same as the second rank numbers with the second users. To be specific, the electronic device 100 interchanges the user B with the user W, interchanges the user H with the user D, and interchanges the user G with the user I, to obtain the video call users corresponding to the display windows at the moment T2. When the quantity of users that are of the video call users in the K display windows and that are ranked beyond the top K in the current activeness ranking is greater than L, a value of M may be L. In the embodiment in FIG. 4, a process in which the first users are interchanged with the second users is merely described as an example in this embodiment of this application, and does not constitute a limitation. The electronic device interchanges the first users whose first rank numbers are the same as the second rank numbers with the second users, so that the first users that are ranked higher in the current activeness ranking can match more favorable display windows.

For example, in the embodiment of FIG. 4, a size of the display window is related to a mark number of the display window (a smaller mark number of the display window indicates a larger size of the display window). Therefore, if the electronic device performs ranking based on the user rank numbers of the second users, to obtain the second rank numbers, and interchanges the first users whose first rank numbers are the same as the second rank numbers with the second users, it can be ensured that the first users that are ranked higher in the current activeness ranking may occupy display windows of larger sizes, so that information (for example, the first users want to make a work report by using a shared screen) to be displayed by the first users can be more visually displayed in front of a user participating in a video call, and efficiency of the video call is improved.

Figure 5B:
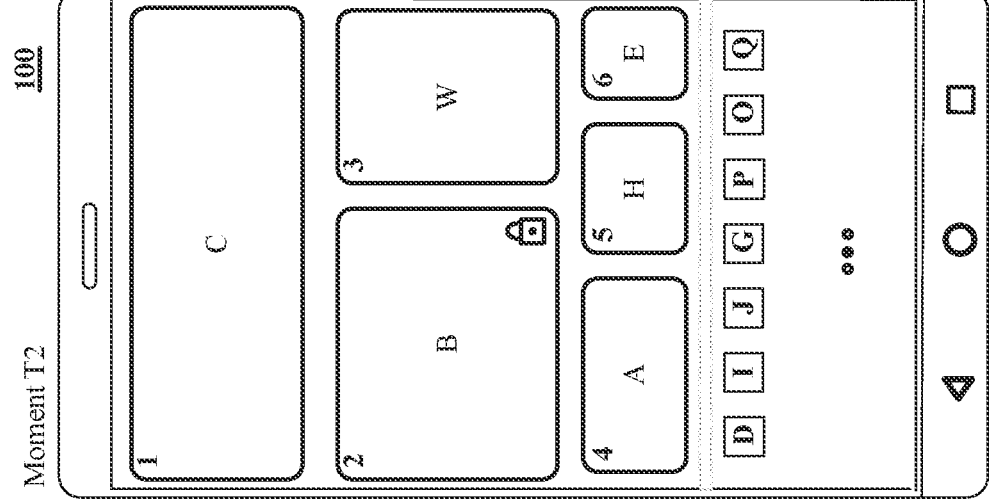
Figure 5B:
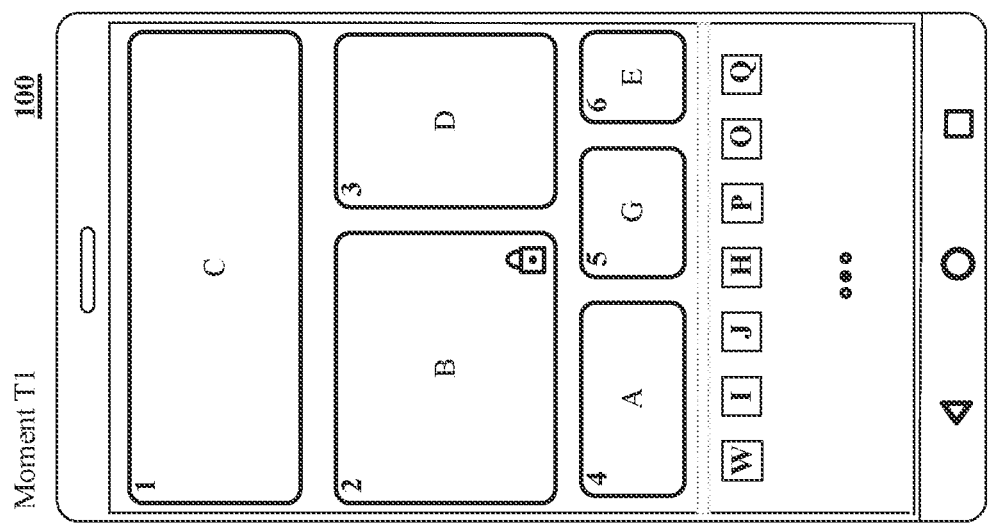

In a second case, before interchanging the first users with the second users, if detecting an input operation such as locking on a display window, the electronic device locks the display window, and the locked display window is not to be interchanged. For example, the locked display window may be a local window of the electronic device. This is merely an example for description in this embodiment of this application, and does not constitute a limitation. For example, in the embodiment of FIG. 4, in a time period from the moment T1 to the moment T2, if the electronic device 100 detects a locking operation on a display window with a mark number of 4, the electronic device 100 locks the display window, and the locked window is shown in FIG. 5A and FIG. 5B. Because the user B is ranked beyond the top six in the current activeness ranking, there are two manners for interchanging the first users with the second users.

Manner a: It is assumed that L is equal to M. The electronic device 100 determines that the users A, D, and G are the second users to be interchanged, and ranks the users A, D, and G based on the user rank numbers of the users A, D, and G, to obtain second rank numbers: 1-D, 2-A, and 3-G (a rule for setting the second rank numbers in this embodiment of this application is: When a user rank number is ranked higher, a second rank number is ranked higher. The rule for setting the second rank numbers is merely an example for description in this embodiment of this application, and does not constitute a limitation). The electronic device 100 selects, from the users W, H, I, and K, users W, H, and I that have the highest current activeness as the first users, and ranks the users based on the current activeness ranking of the users, to obtain first rank numbers: 1-W, 2-H, and 3-I. The electronic device 100 interchanges the first users whose first rank numbers are the same as the second rank numbers with the second users (interchanges users W and D, interchanges users A and H, and interchanges users G and I).

Manner b: It is assumed that M is less than L. When the display window corresponding to the user B is locked, it is determined that the user D and the user G in the users D, G, and B are second users, and are ranked based on user rank numbers of the users, to obtain second rank numbers of the user D and the user G: 1-D and 2-G. The first rank numbers 1-W and 2-H of the first users may be obtained based on the current activeness ranking. The electronic device 100 interchanges the first users whose first rank numbers are the same as the second rank numbers with the second users (interchanges the user D with the user W, and interchanges the user G with the user H), to obtain video call users corresponding to the display windows at the moment T2.

In a third case, before the M first users are interchanged with the second users in the M corresponding second display windows, if the electronic device detects that the locking operation on the locked display window is canceled, when the electronic device interchanges the first users with the second users, refer to the embodiment in FIG. 3 for a specific process. Details are not described herein again.

In a fourth case, before the electronic device interchanges the M first users with the second users in the M display windows, if the electronic device detects that a third user is in a first state, the electronic device adjusts a location of the third user in the current activeness ranking. The first state may be a working state in which a screen is shared in the display window, may be a working state in which a video stream is imported and played in the display window, may be a working state in which an audio stream is imported in the display window, or may be a working state after the electronic device detects a first input operation on the display window (the first input operation includes but is not limited to an input operation such as manually interchanging sequences or locations of display windows by a user on a screen of a terminal device in a manner such as a button, sliding, or dragging). This is merely an example for description in this embodiment of this application, and does not constitute a limitation. The third user is a video call user that is of the video call users in the K display windows, that is in the first state, and that is ranked beyond the top K in the current activeness ranking. The third user is ranked in the top K in an activeness ranking after adjustment, or may be consistent with a user rank number of the third user, which may also ensure that the third user is ranked in the top K in the current activeness ranking. This is merely an example for description in this embodiment of this application, and does not constitute a limitation. When detecting that the third user is in the first state, the electronic device determines that the third user is an active video call member. If the video call user in the display window is ranked beyond the top K in the current activeness ranking, the electronic device adjusts a location of the video call user in the current activeness ranking, so that an activeness rank of the video call user is the same as a user rank thereof (or the video call user is made to be ranked in the top K in the current activeness ranking), thereby ensuring that the third user is not to be interchanged.

Figure 6:
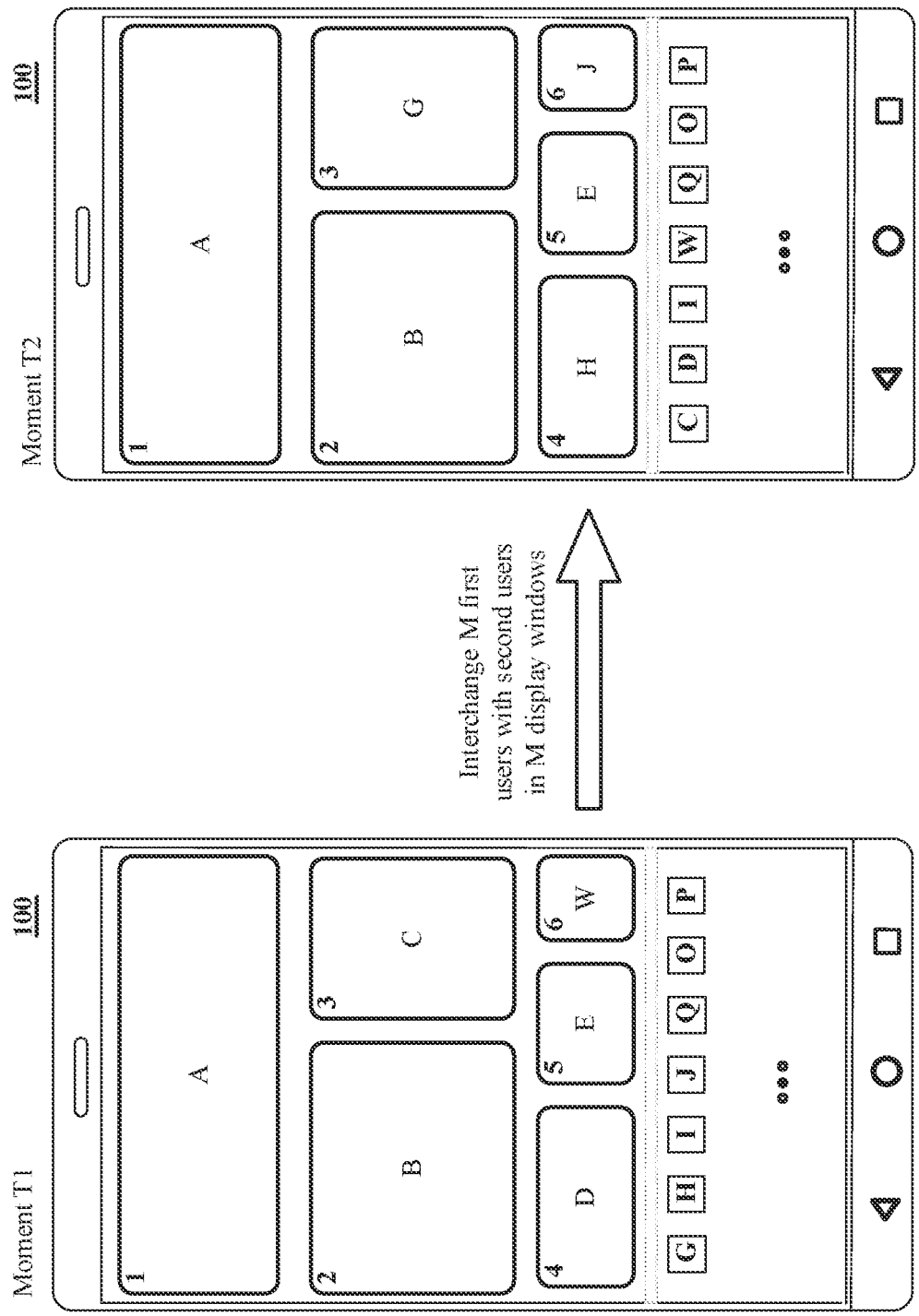
FIG. 6 is a diagram of another interface on which users in display windows are interchanged according to an embodiment of this application.

For example, as shown in FIG. 6, at a moment T1, video call users corresponding to display windows of the electronic device 100 are A, B, C, D, E and W, and user rank numbers of the video call users are respectively 1-A, 2-B, 3-C, 4-D, 5-E and 6-W. Based on the setting rule of L, it is assumed that L is equal to 3. At a moment T2, a current activeness ranking of video call users is 1-B, 2-E, 3-G, 4-H, 5-J, 6-C, 7-A, 8-D, 9-W, 10-I, 11-Q, 12-O, 13-P, . . . . The user rank numbers at the moment T1 are compared with the current activeness ranking of the video call users, and the users A, D, and W are ranked beyond the top six in the current activeness ranking. If it is assumed that L is equal to 3 based on the setting rule of L, and before the first users are interchanged with the second users, the electronic device 100 detects that the user A initiates screen sharing (in the first state), the electronic device 100 determines that the user A is an active video call user. To prevent the user A from being interchanged by a first user, the electronic device 100 needs to raise a location of the user A in the current activeness ranking, so that the user A is ranked the first in the current activeness ranking (the same as a user rank of A) or the user A is ranked in the top six in the current activeness ranking. A manner in which the electronic device 100 raises the location of the user A in the current activeness ranking may be adjusting the weight value $W_{ri}$ in the formula F in step S201 and the weight value $W_{rn}$ in the formula P1. This is merely an example for description in this embodiment of this application, and does not constitute a limitation. In the video call users that are ranked in the top six in the current activeness ranking, the user C is ranked lower than the user J. After the location of the user A in the activeness ranking is adjusted, the user C is ranked beyond the top six in the activeness ranking. Therefore, the electronic device 100 determines that the users C, D, and W are the second users (the users D and W are ranked beyond the top six in the current activeness ranking), and then obtains second rank numbers of the users C, D, and W: 1-C, 2-D, and 3-W based on the ranking rule in the embodiment in FIG. 4. Then, the electronic device 100 selects the users G, H, and J as the first users, and then obtains first sequence numbers of the users G, H, and J: 1-G, 2-H, and 3-J based on the ranking rule in the embodiment in FIG. 4 or FIG. 5A and FIG. 5B. Then, the electronic device 100 interchanges the users C and G, interchanges the users D and H, and interchanges the users J and W at the moment T2, to obtain video call users corresponding to the six display windows at the moment T2. It should be noted that in FIG. 6, if a current activeness ranking of the video call users at the moment T2 is 1-B, 2-E, 3-G, 4-H, 5-C, 6-J, 7-A, 8-D, 9-W, 10-I, 11-Q, 12-O, 13-P, . . . , when the electronic device 100 raises the location of the user A in the current activeness ranking to be the same as a user rank of the user A, the user C is ranked higher than the user i in the activeness ranking among video call users that are ranked in the top six in the current activeness ranking. Therefore, among video call users G, H, and J that do not correspond to the display windows, only users G and H are first users, and may be interchanged with second users in corresponding display windows. In this case, M is equal to 2 (M<L).

In a fifth case, before the electronic device interchanges the M first users with the second users in the M display windows, the electronic device adjusts a location of a fourth user in the current activeness ranking, so that the fourth user can be interchanged with a second user in a corresponding display window. The fourth user is S users that are ranked higher in the activeness ranking and that are among video call users that are ranked beyond the top K in the current activeness ranking and that are in a second state, where S is less than or equal to M. The fourth user is ranked in the top M in a current activeness ranking after adjustment. Then, the electronic device interchanges the first users with the second users in the display windows based on the interchanging rule in the embodiment in FIG. 4. For example, the second state may be a working state in which the fourth user is high in activeness in adjacent preset duration. For example, the fourth user makes speeches more frequently and for a relatively long time in the adjacent preset duration, or the fourth user performs an operation such as sharing a screen in the adjacent preset duration. This is merely an example for description in this embodiment of this application, and does not constitute a limitation. This manner is beneficial to a video call user who newly participates in a video call. Even if a location of the video call user in the current activeness ranking does not meet a requirement of being interchanged with a second user, because the video call user is active enough in the adjacent duration, the video call user is allowed to be interchanged with a second user that is ranked beyond the top K in the current activeness ranking.

Figure 7:
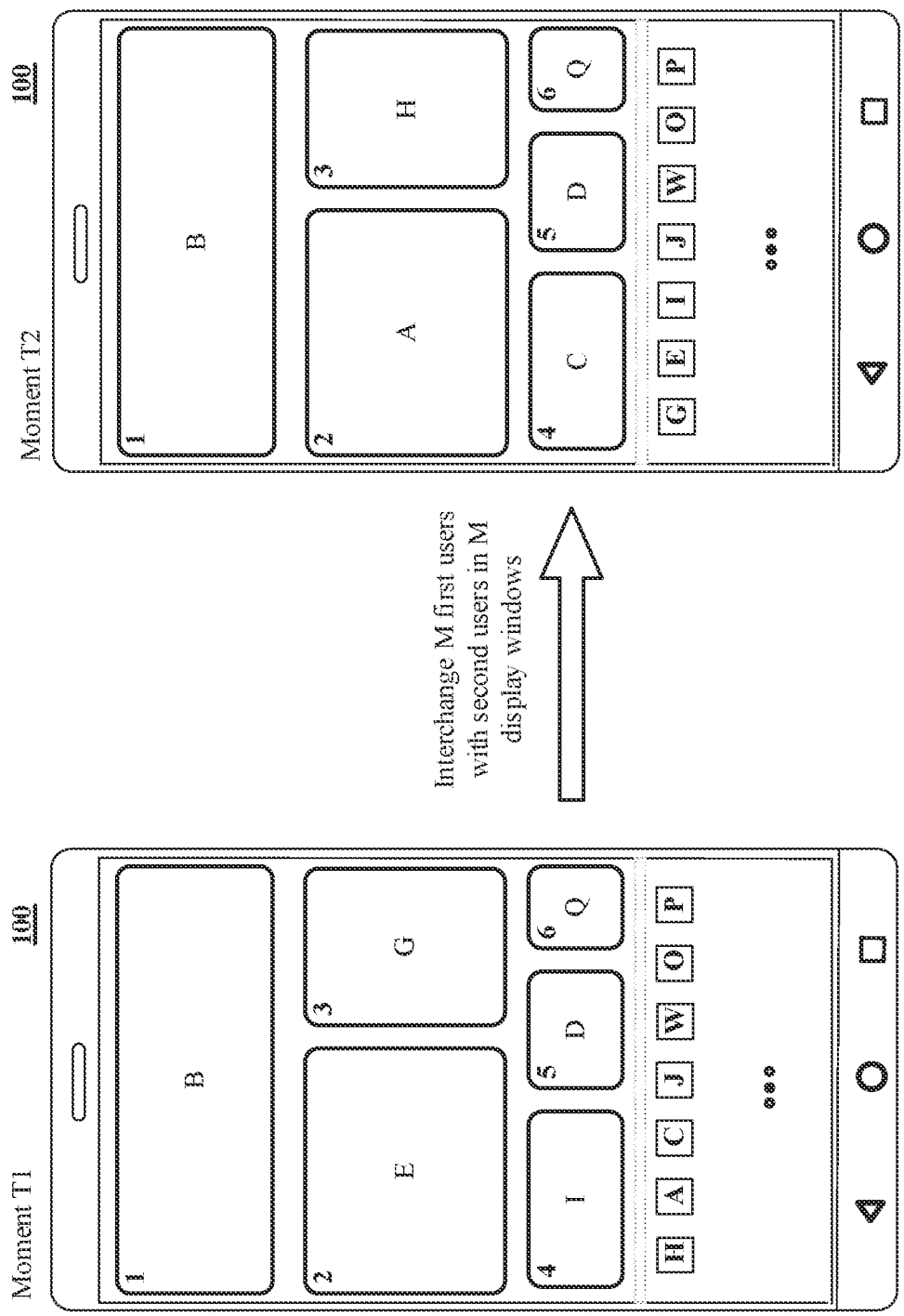
FIG. 7 is a diagram of another interface on which users in display windows are interchanged according to an embodiment of this application.

For example, as shown in FIG. 7, video call users corresponding to display windows of the electronic device 100 are users B, E, G, I, D and Q, and user rank numbers of the users are 1-B, 2-E, 3-G, 4-I, 5-D and 6-Q. An activeness ranking of video call users at a moment T2 is 1-A, 2-B, 3-H, 4-O, 5-D, 6-Q, 7-C, 8-E, 9-J, 10-P, 11-G, 12-I, 13-W, . . . . The user C is a video call user that just joins at a time point between T1 and T2, and the electronic device 100 detects that the user C is relatively active in a time period from T1 to T2 (for example, the user C speaks frequently), determines that the user C is a fourth user, and gives the user C a preferential interchange qualification. Based on the interchanging rule in the embodiment in FIG. 3, users E, I, and G are second users to be interchanged in display windows (L=3, and L=M), and users A, H, and O are first users to be interchanged with the second users. Because user C is the fourth user to be preferentially interchanged, the electronic device 100 substitutes the user C for the user O that is ranked the lowest in an activeness ranking of the users A, H, and O. Therefore, the users A, H, and C are used as first users to be interchanged with the users E, I, and G, to obtain video call users corresponding to the display windows at the moment T2. For a process of interchanging the users E, I, and G with the users A, H, and C, refer to the embodiment in FIG. 4. Details are not described again in this embodiment of this application. In addition, if a rank of the fourth user in the current activeness ranking reaches a threshold, the electronic device may grant a preferential interchange permission to the fourth user. For an interchanging process, refer to the embodiment in FIG. 7. Details are not described again in this embodiment of this application.

In a possible implementation, if all users of the video call users corresponding to the K display windows are ranked in the top K in the current activeness ranking, the quantity of user rank changes may be understood as a quantity N of video call users that are of the video call users corresponding to the K display windows and that have user rank numbers inconsistent with the current activeness ranking. If the quantity N is greater than or equal to M, the electronic device interchanges the M first users that are of the video call users corresponding to the K display windows with the second users in the M display windows. There are the following three cases in which the electronic device interchanges the M first users with the second users in the M display windows.

In a first case, the electronic device sets a sequence number i to 1, and then selects a first video call user with a sequence number i and a second video call user with a sequence number i respectively from a first user sequence and a second user sequence. The first user sequence includes L video call users that are ranked higher in the current activeness ranking, the second user sequence includes L video call users whose sequence numbers are ranked higher in a user rank sequence, and the user rank sequence includes the K video call users that have user rank numbers. Then, the electronic device determines whether locations of both the first video call user and the second video call user in the user rank sequence are changed. If it is determined that the locations of both the first video call user and the second video call user in the user rank sequence are changed, the electronic device updates the sequence number i based on a formula i=i+1, and performs the step that the electronic device selects a first video call user with a sequence number i and a second video call user with a sequence number i respectively from a first user sequence and a second user sequence. If it is determined that the locations of both the first video call user and the second video call user in the user rank sequence are not changed, the electronic device determines whether the first video call user is ranked higher in the current activeness ranking than the second video call user. If the first video call user is not ranked higher in the current activeness ranking than the second video call user, the electronic device updates the sequence number i based on a formula i=i+1, and performs the step that the electronic device selects a first video call user with a sequence number i and a second video call user with a sequence number i respectively from a first user sequence and a second user sequence. If the first video call user is ranked higher in the current activeness ranking than the second video call user, the electronic device interchanges locations of the first video call user and the second video call user in the user rank sequence, to obtain an updated user rank sequence. Then, the electronic device determines, in the updated user rank sequence, whether a quantity of users whose user rank numbers are changed is greater than or equal to L. If it is determined that the quantity of users whose user rank numbers are changed is greater than or equal to L, the electronic device interchanges the M first users whose user rank numbers are changed in the updated user rank sequence with the second users in the M display windows. If it is determined that the quantity of users whose user rank numbers are changed is less than L, the electronic device updates the sequence number i based on a formula i=i+1, and performs the step that the electronic device selects a first video call user with a sequence number i and a second video call user with a sequence number i respectively from a first user sequence and a second user sequence.

It should be noted that in this embodiment of this application, the electronic device ranks the L video call users that are ranked higher in the current activeness ranking based on the current activeness ranking of the video call users, to obtain the first user sequence. In the first user sequence, each video call user has a sequence number i, and the sequence number i represents an activeness rank of the video call user in the first user sequence. The electronic device ranks the video call users in the K display windows based on the user rank numbers of the video call users in the K display windows, to obtain the second user sequence. In the second user sequence, the user rank numbers of the video call users are sequence numbers of the video call users in the user sequence.

Figure 8:
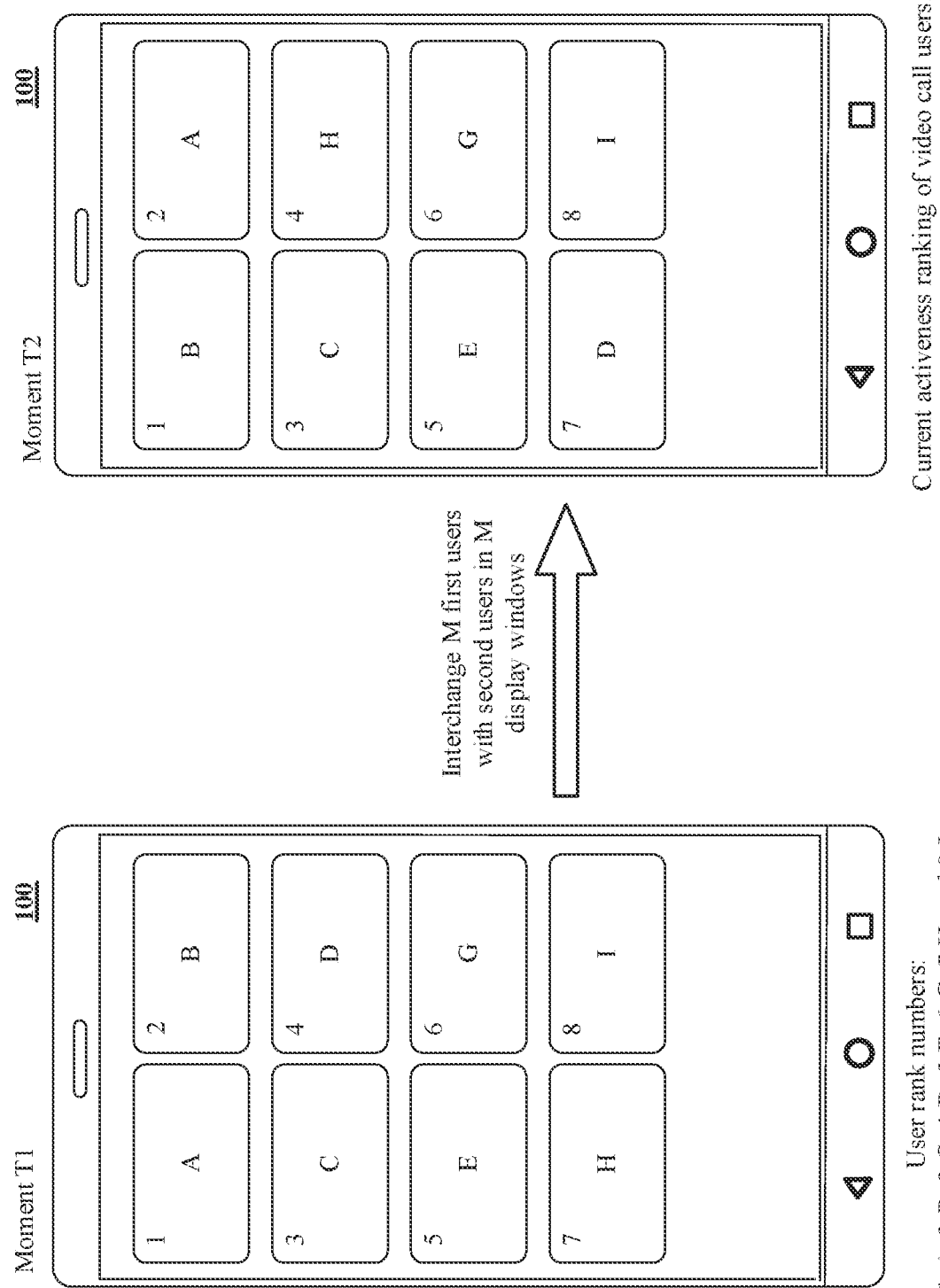
FIG. 8 is a diagram of another interface on which users in display windows are interchanged according to an embodiment of this application.

The following describes the first case by using an example in this embodiment of this application. For example, as shown in FIG. 8, there are eight display windows on a displayed interface of an electronic device 100, and based on a value range of L being [Ceil (K/3), Floor (K/2)], L=4 is used as an example for description in this embodiment of this application. At a moment T1, video call users corresponding to the display windows of the electronic device 100 are A, B, C, D, E, G, H, and I. Therefore, the electronic device 100 may obtain a user rank sequence: 1-A, 2-B, 3-C, 4-D, 5-E, 6-G, 7-H, 8-I based on a correspondence between the display windows and the video call users. The electronic device 100 selects, from the user rank sequence, video call users whose user rank numbers are ranked in the top four, to obtain a second user sequence (1-A, 2-B, 3-C, 4-D). At a moment T2, the electronic device 100 obtains a current activeness ranking of the video call users at the moment T2: 1-B, 2-C, 3-I, 4-H, 5-G, 6-E, 7-A, 8-D, . . . , and the electronic device 100 selects video call users that are ranked in the top four in the activeness ranking, to obtain a first user sequence (1-B, 2-C, 3-I, 4-H). The electronic device 100 selects a user B (a first video call user) whose sequence number i is 1 and a user A (a second video call user) whose sequence number i is I from the first user sequence and the second user sequence. Because neither locations of the user B and the user A in the user rank sequence are changed, and the user B is ranked higher in the current activeness ranking than the user A, the electronic device 100 interchanges locations of the user B and the user A in the user rank sequence, to obtain an updated user rank sequence (1-B, 2-A, 3-C, 4-D, 5-E, 6-G, 7-H, 8-I). The electronic device 100 compares the updated user rank sequence with the original user rank sequence (1-A, 2-B, 3-C, 4-D, 5-E, 6-G, 7-H, 8-I), and a quantity of users whose user rank numbers are changed is 2 (less than 4). Therefore, the electronic device 100 selects a user C (a first video call user) whose sequence number i is 2 and a user B (a second video call user) whose sequence number i is 2 from the first user sequence and the second user sequence. Because a location of the user C in the original user rank sequence is not changed, and the user C is ranked lower in the current activeness ranking than the user B, the electronic device 100 does not interchange locations of the user B and the user C in the updated first user sequence. Then, the electronic device 100 selects a user I (a first video call user) whose sequence number i is 3 and a user C (a second video call user) whose sequence number i is 3 from the first user sequence and the second user sequence. Because neither locations of the user I and the user C in the original user rank sequence are changed, and the user C is ranked higher in the current activeness ranking than the user I, the electronic device 100 does not interchange the locations of the user I and the user C in the updated first user sequence. Then, the electronic device 100 selects a user H (a first video call user) whose sequence number i is 4 and a user D (a second video call user) whose sequence number i is 4 from the first user sequence and the second user sequence. Because locations of the user H and the user D in the user rank sequence are not changed, and the user H is ranked higher in the current activeness ranking than the user D, the electronic device 100 interchanges the locations of the user H and the user D in the user rank sequence, to obtain an updated user rank sequence (1-B, 2-A, 3-C, 4-H, 5-E, 6-G, 7-D, 8-I). Then, the electronic device 100 compares the updated user rank sequence (I-B, 2-A, 3-C, 4-H, 5-E, 6-G, 7-D, 8-I) with the original user rank sequence (1-A, 2-B, 3-C, 4-D, 5-E, 6-G, 7-H, 8-I), and a quantity of users whose user rank numbers are changed is 4. The electronic device 100 determines that users B, A, H, and D whose user rank numbers are changed in the updated user rank sequence are the first users, and determines that users A, B, D, and H in the original user sequence (1-A, 2-B, 3-C, 4-D, 5-E, 6-G, 7-H, 8-I) are the second users. The electronic device 100 interchanges the first users with the second users (interchanges the user B with the user A, interchanges the user A with the user B, interchanges the user H with the user D, and interchanges the user D with the user H).

In a second case, the electronic device sets a sequence number i to 1, and then selects a first video call user with a sequence number i and a third video call user with a sequence number i respectively from a first user sequence and a user rank sequence. The first user sequence includes L video call users that are ranked higher in the current activeness ranking, and the user rank sequence includes K video call users that have user rank numbers. The electronic device determines whether the first video call user and the third video call user are a same user. If the first video call user and the third video call user are a same user, the electronic device updates the sequence number i based on a formula i=i+1, and performs the step that the electronic device selects a first video call user with a sequence number i and a third video call user with a sequence number i respectively from a first user sequence and a user rank sequence. If the first video call user and the third video call user are different users, the electronic device interchanges locations of the first video call user and the third video call user in the user rank sequence, to obtain an updated user rank sequence. Then, the electronic device determines whether a quantity of users whose user rank numbers are changed in the updated user rank sequence is greater than or equal to L. If the quantity of users whose user rank numbers are changed in the updated user rank sequence is greater than or equal to L, the electronic device interchanges the M first users whose user rank numbers are changed in the updated user rank sequence with the second users in the M display windows. If the quantity of users whose user rank numbers are changed in the updated user rank sequence is less than L, the electronic device updates the sequence number i based on a formula i=i+1, and performs the step that the electronic device selects a first video call user with a sequence number i and a third video call user with a sequence number i respectively from a first user sequence and a user rank sequence.

Figure 9:
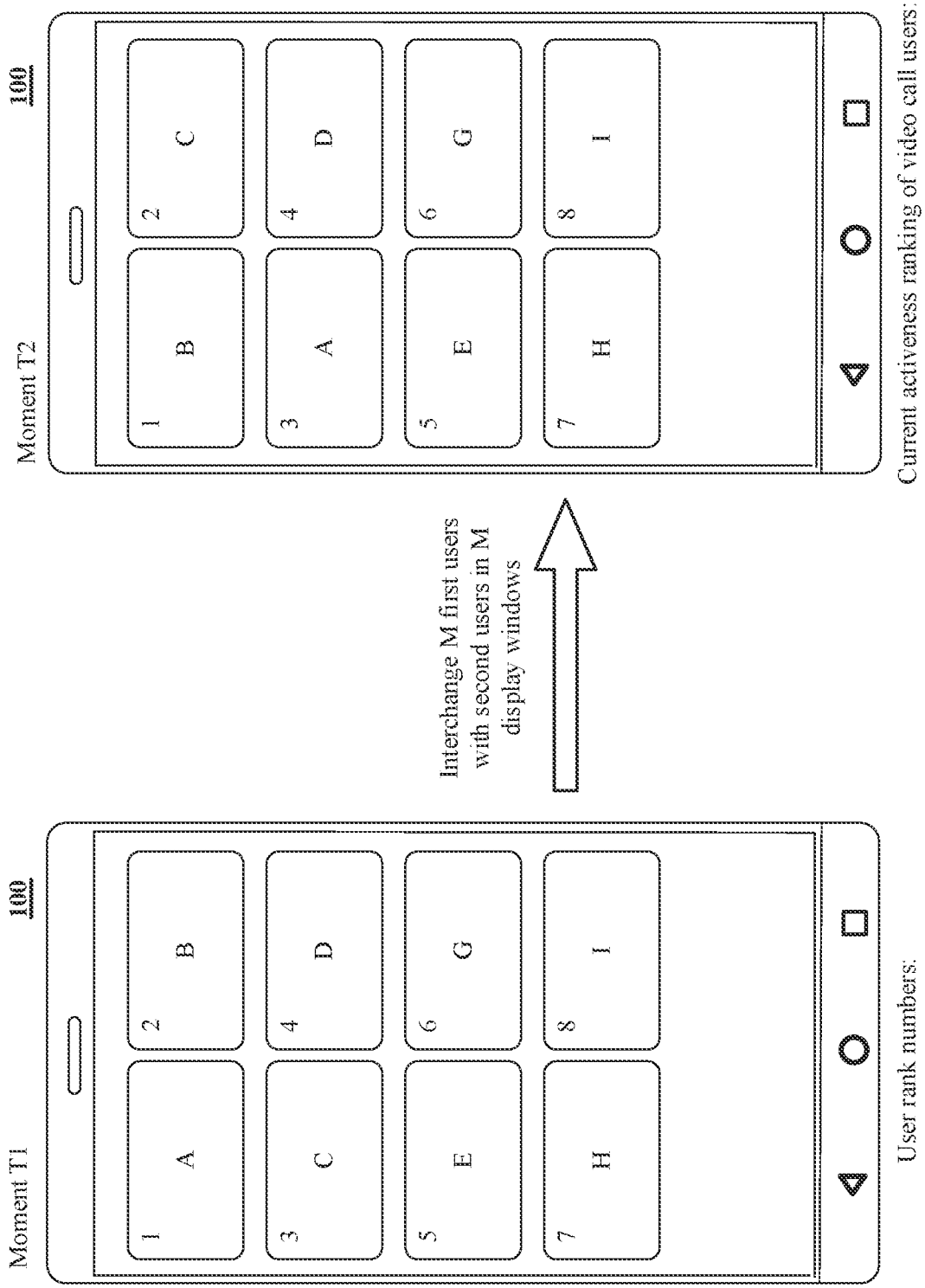
FIG. 9 is a diagram of another interface on which users in display windows are interchanged according to an embodiment of this application.

The following describes the second case by using an example in this embodiment of this application. For example, as shown in FIG. 9, there are eight display windows on a displayed interface of the electronic device 100. It is assumed that L is equal to 4, and video call users corresponding to the display windows are 1-A, 2-B, 3-C, 4-D, 5-E, 6-G, 7-H, and 8-I. A user rank sequence (1-A, 2-B, 3-C, 4-D, 5-E, 6-G, 7-H, 8-I) may be obtained based on the video call users corresponding to the display windows. For a manner for determining the user rank sequence, refer to the embodiment of the first case. Details are not described herein again. At a moment T2, the electronic device 100 obtains a current activeness ranking of the video call users at the moment T2: 1-B, 2-C, 3-I, 4-H, 5-G, 6-E, 7-A, 8-D, . . . , and selects users that are ranked in the top four in the activeness ranking, to obtain a first user sequence (1-B, 2-C, 3-I, 4-H). The electronic device 100 selects a first video call user (the user B) with a sequence number 1 and a third video call user (the user A) with a sequence number 1 respectively from the first user sequence and the user rank sequence. The electronic device 100 determines that the user B and the user A are not a same user, and interchanges locations of the user A and the user B in the user rank sequence, to obtain an updated user rank sequence (1-B, 2-A, 3-C, 4-D, 5-E, 6-G, 7-H, 8-I). In the updated user rank sequence, a quantity of video call users whose user rank numbers are changed is 2 (less than L), and the electronic device 100 selects a first video call user (the user C) with a sequence number 2 and a third video call user (the user A) with a sequence number 2 respectively from the updated user rank sequence and the first user sequence. Because the user C and the user A are not a same user, the electronic device 100 interchanges locations of the user A and the user C in the user rank sequence (1-B, 2-A, 3-C, 4-D, 5-E, 6-G, 7-H, 8-I), to obtain an updated user rank sequence (1-B, 2-C, 3-A, 4-D, 5-E, 6-G, 7-H, 8-I). In the updated user rank sequence, a quantity of video call users whose user rank numbers are changed is equal to 4. Therefore, the electronic device 100 compares the user rank sequence (1-B, 2-C, 3-A, 4-D, 5-E, 6-G, 7-H, 8-I) with the original user rank sequence (1-A, 2-B, 3-C, 4-D, 5-E, 6-G, 7-H, 8-I), determines that video call users whose user rank numbers are changed are the first users, and interchanges the first users with the second users in corresponding display windows, to obtain video call users corresponding to the display windows of the electronic device 100 at the moment T2.

In a third case, in the first case and the second case, if a video call user in a display window is in a third state, the first user sequence, the second user sequence, and the user rank sequence do not include the video call user in the third state. The third state may be a locked state. This is merely an example for description in this embodiment of this application, and does not constitute a limitation. For example, in the embodiment of FIG. 9, if the display window of the user B is in the locked state, the first user sequence does not include the user B, the first user sequence is 1-C, 2-I, 3-H, 4-G, and the user rank sequence is 1-A, 2-C, 3-D, 4-E, 5-G, 6-H, 7-I. The electronic device 100 selects a user C with a sequence number 1 and a user A with a sequence number 1 from the first user sequence and the user rank sequence for compari-son. The user C and the user A are not a same user. The electronic device 100 interchanges locations of the user C and the user A in the user rank sequence, to obtain an updated user rank sequence (1-C, 2-A, 3-D, 4-E, 5-G, 6-H, 7-I). The electronic device 100 selects a user A with a sequence number 2 and a user I with a sequence number 2 from the updated user rank sequence and the first user sequence for comparison. The two users are not a same user. The electronic device 100 interchanges locations of the user I and the user A in the user rank sequence, to obtain an updated user rank sequence (1-C, 2-I, 3-D, 4-E, 5-G, 6-H, 7-A). In the updated user rank sequence, there are three users whose user rank numbers are changed. Therefore, the electronic device selects a user H with a sequence number 3 and a user D with a sequence number 3 from the first user sequence and the updated user rank sequence, and then interchanges locations of the user H and the user D in the updated user rank sequence, to obtain an updated user rank sequence (1-C, 2-I, 3-H, 4-E, 5-G, 6-D, 7-A). Compared with the original user rank sequence (1-A, 2-C, 3-D, 4-E, 5-G, 6-H, 7-I), in the updated user rank sequence (1-C, 2-I, 3-H, 4-E, 5-G, 6-D, 7-A), there are five users whose user rank numbers are changed, and 5 is greater than L=4. Therefore, the electronic device 100 compares the user rank sequence (1-C, 2-I, 3-D, 4-E, 5-G, 6-H, 7-A) with the original user rank sequence, determines that the user A, the user C, and the user I whose user rank numbers are changed are the first users, and separately interchanges the first users with the user A, the user C, and the user I in the display windows, to implement the interchange of the display windows.

In embodiments of this application, when a current activeness ranking of a video call user in a display window is inconsistent with a user rank number of the video call user, the video call user is interchanged with another video call user. When an excessively large quantity of video call users in display windows are interchanged, a jump transition occurs at an excessively large quantity of display windows, which results in an unstable displayed interface of an electronic device and causes poor visual experience for a user. In addition, if the quantity of display window jump transitions is excessively large, the electronic device occupies excessive bandwidth when transmitting a video stream, which causes a waste of bandwidth and increases load of a cloud server. In embodiments of this application, a maximum quantity L of display windows to be interchanged is set, so that a quantity of video call users to be interchanged is limited to be within L when the quantity of interchanged video call users in the display windows is greater than L, and a quantity of jumping display windows is controlled when it is ensured as much as possible that a video call user corresponding to a display window is ranked higher in activeness, to ensure interface stability, thereby providing good visual effect for the user, reducing the bandwidth occupied by video stream transmission, and reducing the load of the cloud server.

Figure 10:
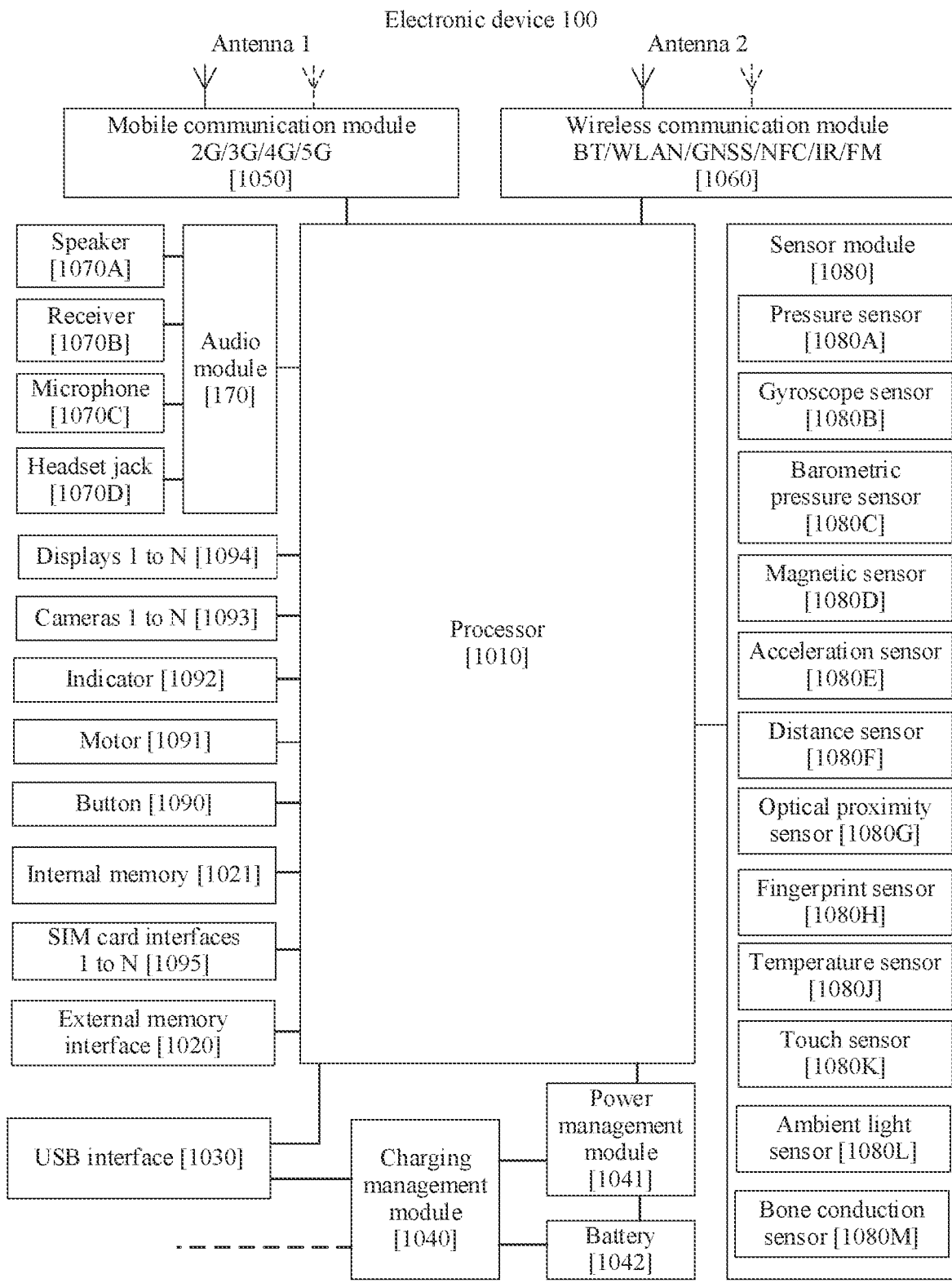
FIG. 10 is a diagram of a hardware structure of an electronic device according to an embodiment of this application.

FIG. 10 shows an example of a hardware structure of the electronic device 100.

The electronic device 100 may include a processor 1010, an external memory interface 1020, an internal memory 1021, a universal serial bus (universal serial bus, USB) interface 1030, a charging management module 1040, a power management module 1041, a battery 1042, an antenna 1, an antenna 2, a mobile communication module 1050, a wireless communication module 1060, an audio module 1070, a speaker 1070A, a receiver 1070B, a microphone 1070C, a headset jack 1070D, a sensor module 1080, a button 1090, a motor 1091, an indicator 1092, a camera 1093, a display 1094, a subscriber identity module (subscriber identity module, SIM) card interface 1095, and the like. The sensor module 1080 may include a pressure sensor 1080A, a gyroscope sensor 1080B, a barometric pressure sensor 1080C, a magnetic sensor 1080D, an acceleration sensor 1080E, a distance sensor 1080F, an optical proximity sensor 1080G, a fingerprint sensor 1080H, a temperature sensor 1080J, a touch sensor 1080K, an ambient light sensor 1080L, a bone conduction sensor 1080M, and the like.

It may be understood that the structure shown in this embodiment of this application does not constitute a specific limitation on the electronic device 100. In some other embodiments of this application, the electronic device 100 may include more or fewer components than those shown in the figure, some components may be combined, or some components may be split, or different component arrangements may be used. The illustrated components may be implemented in hardware, software, or a combination of software and hardware.

The processor 1010 may include one or more processing units. For example, the processor 1010 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 1010, and is configured to store instructions and data. In some embodiments, the memory in the processor 1010 is a cache. The memory may store an instruction or data that is used or cyclically used by the processor 1010. If the processor 1010 needs to use the instruction or the data again, the processor may directly invoke the instruction or the data from the memory. This avoids repeated access and reduces waiting time of the processor 1010, so that system efficiency is improved.

A wireless communication function of the electronic device 100 may be implemented by using the antenna 1, the antenna 2, the mobile communication module 1050, the wireless communication module 1060, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further reused to improve antenna utilization. For example, the antenna 1 may be reused as a diversity antenna in a wireless local area network. In some other embodiments, an antenna may be used in combination with a tuning switch.

The mobile communication module 1050 may provide a wireless communication solution that includes 2G/3G/4G/5G or the like and that is used in the electronic device 100. The mobile communication module 1050 may include at least one filter, a switch, a power amplifier, a low noise amplifier (low noise amplifier, LNA), and the like. The mobile communication module 1050 may receive an electromagnetic wave through the antenna 1, perform processing such as filtering or amplification on the received electromagnetic wave, and transmit the electromagnetic wave to the modem processor for demodulation. The mobile communication module 1050 may further amplify a signal modulated by the modem processor, and convert the signal into an electromagnetic wave for radiation through the antenna 1. In some embodiments, at least some functional modules in the mobile communication module 150 may be disposed in the processor 1010. In some embodiments, at least some functional modules of the mobile communication module 1050 and at least some modules of the processor 1010 may be disposed in a same device.

The modem processor may include a modulator and a demodulator. The modulator is configured to modulate a to-be-sent low-frequency baseband signal into a medium-high frequency signal. The demodulator is configured to demodulate the received electromagnetic wave signal into the low-frequency baseband signal. Then, the demodulator transmits the demodulated low-frequency baseband signal to the baseband processor for processing. The low-frequency baseband signal is processed by the baseband processor and then transferred to the application processor. The application processor outputs a sound signal through an audio device (which is not limited to the speaker 1070A, the receiver 1070B, or the like), or displays an image or a video through the display 1094. In some embodiments, the modem processor may be an independent component. In some other embodiments, the modem processor may be independent of the processor 1010, and is disposed in a same device as the mobile communication module 1050 or another functional module.

The wireless communication module 1060 may provide a solution that is used in the electronic device 100 and that includes wireless communication such as a wireless local area network (wireless local area network, WLAN) (for example, a wireless fidelity (wireless fidelity, WIFI) network), Bluetooth (Bluetooth, BT), a global navigation satellite system (global navigation satellite system, GNSS), frequency modulation (frequency modulation, FM), NFC, and an infrared (infrared, IR) technology. The wireless communication module 1060 may be one or more components integrating at least one communication processor module. The wireless communication module 1060 receives an electromagnetic wave through the antenna 2, performs frequency modulation and filtering processing on the electromagnetic wave signal, and sends a processed signal to the processor 1010. The wireless communication module 1060 may further receive a to-be-sent signal from the processor 1010, perform frequency modulation and amplification on the signal, and convert the signal into an electromagnetic wave for radiation through the antenna 2.

In some embodiments, the antenna 1 of the electronic device 100 is coupled to the mobile communication module 850, and the antenna 2 is coupled to the wireless communication module 1060, so that the electronic device 100 may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution. LTE), BT, a GNSS, the WLAN, the NFC, the FM, the IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation system, SBAS).

The electronic device 100 may implement a display function through the GPU, the display 1094, the application processor, and the like. The GPU is a microprocessor for image processing, and is connected to the display 1094 and the application processor. The GPU is used to perform mathematical and geometric calculations, and render an image. The processor 1010 may include one or more GPUs, and execute program instructions to generate or change display information.

The display 1094 is configured to display an image, a video, and the like. The display 1094 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, a quantum dot light-emitting diode (quantum dot light-emitting diode, QLED), or the like. In some embodiments, the electronic device 100 may include one or N displays 1094, where N is a positive integer greater than 1.

In this embodiment of this application, the display 1094 is configured to display the displayed interface that is implemented on the electronic device 100 and that is mentioned in embodiments of this application. The displayed interface includes K display windows, and the K display windows are used to display a video stream corresponding to a video call user.

The digital signal processor is configured to process a digital signal, and may process another digital signal in addition to a digital image signal. For example, when the electronic device 100 selects a frequency, the digital signal processor is configured to perform Fourier transform on frequency energy.

The video codec is used to compress or decompress digital video. The electronic device 100 may support one or more video codecs. In this way, the electronic device 100 may play or record videos in a plurality of encoding formats, for example, moving picture experts group (moving picture experts group, MPEG) 1, MPEG 2, MPEG 3, and MPEG 4.

The internal memory 1021 may be configured to store computer-executable program code. The executable program code includes instructions. The processor 1010 performs various function applications and data processing of the electronic device 100 by running the instructions stored in the internal memory 1021. The internal memory 1021 may include a program storage area and a data storage area. The program storage area may store an operating system, an application required by at least one function (for example, a sound playing function or an image playing function), and the like. The data storage area may store data (such as audio data and a phone book) created in a process of using the electronic device 100. In addition, the internal memory 1021 may include a high-speed random access memory, and may further include a non-volatile memory, for example, at least one magnetic disk storage device, a flash memory, or a universal flash storage (universal flash storage, UFS).

The electronic device 100 may implement an audio function, for example, music playing and recording, through the audio module 1070, the speaker 1070A, the receiver 1070B, the microphone 1070C, the headset jack 1070D, the application processor, and the like.

The audio module 1070 is configured to convert digital audio information into an analog audio signal for output, and is also configured to convert an analog audio input into a digital audio signal. The audio module 1070 may be further configured to encode and decode an audio signal. In some embodiments, the audio module 1070 may be disposed in the processor 1010, or some function modules of the audio module 1070 are disposed in the processor 1010.

The speaker 1070A, also referred to as a "horn", is configured to convert an audio electrical signal into a sound signal. The electronic device 100 may be used to listen to music or answer a call in a hands-free mode over the speaker 1070A.

The pressure sensor 1080A is configured to sense a pressure signal, and may convert the pressure signal into an electrical signal. In some embodiments, the pressure sensor 1080A may be disposed on the display 894. There is a plurality of types of pressure sensors 1080A, for example, a resistive pressure sensor, an inductive pressure sensor, and a capacitive pressure sensor. The capacitive pressure sensor may include at least two parallel plates made of conductive materials. When a force is applied to the pressure sensor 1080A, capacitance between electrodes changes. The electronic device 100 determines pressure intensity based on the change in the capacitance. When a touch operation is performed on the display 894, the electronic device 100 detects intensity of the touch operation through the pressure sensor 1080A. The electronic device 100 may also calculate a touch location based on a detection signal of the pressure sensor 1080A. In some embodiments, touch operations that are performed in a same touch location but have different touch operation intensity may correspond to different operation instructions. For example, when a touch operation whose touch operation intensity is less than a first pressure threshold is performed on an application icon "Messages", an instruction for viewing an SMS message is performed. When a touch operation whose touch operation intensity is greater than or equal to the first pressure threshold is performed on the application icon "Messages", an instruction for creating an SMS message is performed.

The touch sensor 1080K is also referred to as a "touch panel". The touch sensor 1080K may be disposed on the display 894, and the touch sensor 1080K and the display 894 form a touchscreen, which is also referred to as a "touch screen". The touch sensor 1080K is configured to detect a touch operation on or near the touch sensor 1080K. The touch sensor may transfer the detected touch operation to the application processor to determine a type of the touch event. Visual output related to the touch operation may be provided through the display 894. In some other embodiments, the touch sensor 1080K may alternatively be disposed on a surface of the electronic device 100 at a location different from a location of the display 894.

A software system of the electronic device 100 may use a layered architecture, an event-driven architecture, a microkernel architecture, a micro service architecture, or a cloud architecture. In an embodiment of this application, an Android system with a layered architecture is used as an example to describe the software structure of the electronic device 100.

Figure 11:
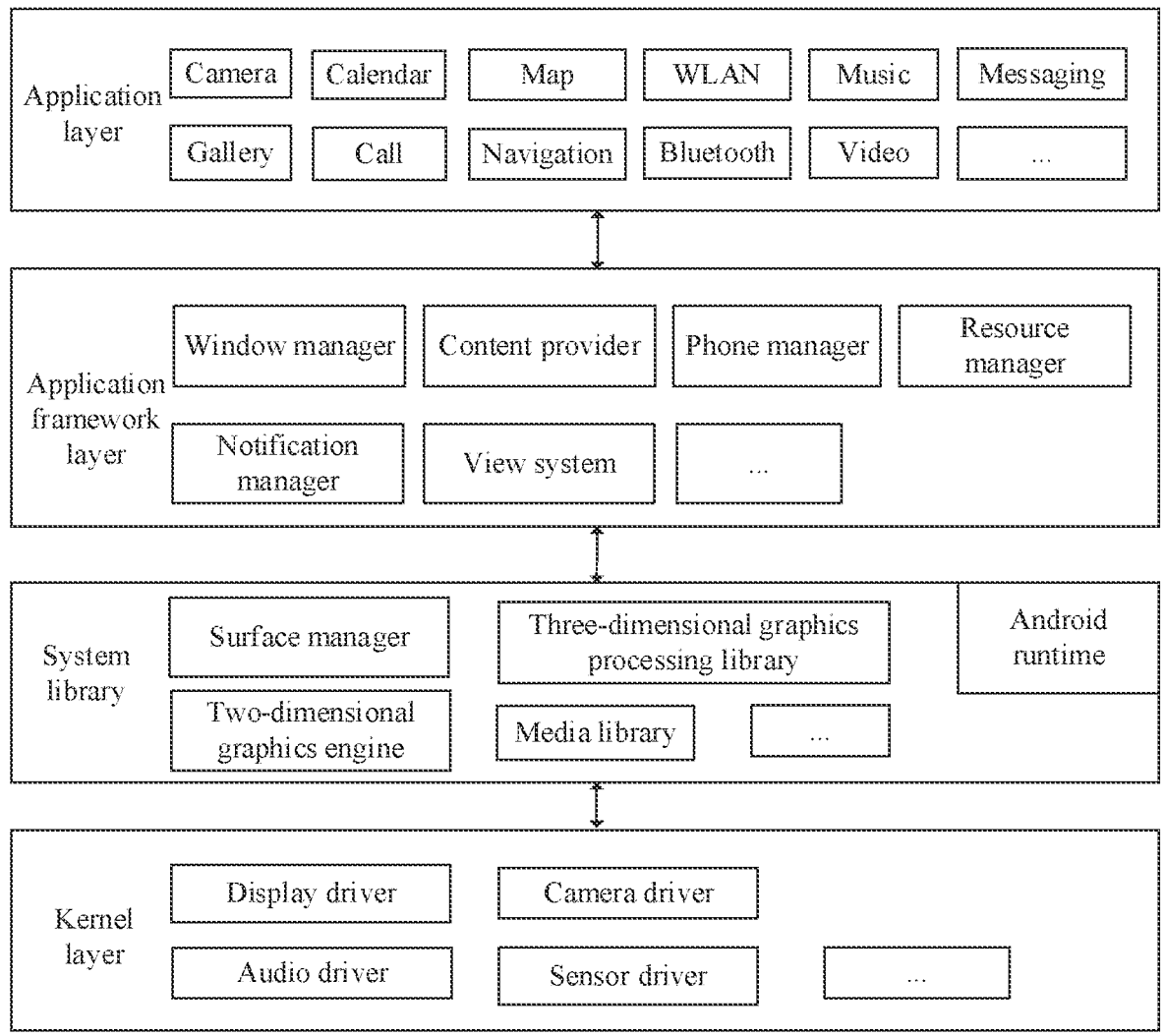
FIG. 11 is a block diagram of a software structure of an electronic device according to an embodiment of this application.

FIG. 11 is a block diagram of a software structure of an electronic device 100 according to an embodiment of this application.

In the layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 11, the application package may include applications, such as a video-type application, a game-type application, an office-type application, Camera, Gallery, Calendar, Call, Map, Navigation, WLAN, Bluetooth, Music, and Messaging. For ease of description, the video-type application is referred to as a video application for short, and the game-type application is referred to as a game application for short.

The video application provides an audio and video service for the electronic device 100. The electronic device 100 may run the video application, and obtain a network video from a server corresponding to the video application. There may be one or more video applications, for example, Huawei Video. The server corresponding to the video application is a server that is provided by a developer of the video application and that is configured to manage the application and provide audio and video services for the application, for example, a Huawei video server.

The video application provides a function of interchanging video call users in display windows. For example, when the electronic device 100 interchanges, based on a current activeness ranking of the video call users, M first users having changed ranks with second users in M display windows when a quantity of user rank changes reaches L.

The game application provides a game service for the electronic device 100. The electronic device 100 may run the game application, and obtain a game resource locally or from a server corresponding to the game application. There may be one or more game applications.

The application framework layer provides an application programming interface (application programming interface, API) and a programming framework for the applications at the application layer. The application framework layer includes some predefined functions.

As shown in FIG. 11, the application framework layer may include a scenario awareness module, a window manager, a content provider, a view system, a phone manager, a resource manager, a notification manager, and the like.

Specifically, the scenario awareness module is configured to listen to a foreground or a top-layer activity (activity), and identify, based on the activity detected by listening, an application that is run in the foreground and that is of the electronic device 100, and may further determine, based on the application that is run in the foreground, a scenario in which the electronic device 100 is located.

The scenario awareness module is an optional module. In some embodiments of this application, a function of the scenario awareness module may be integrated into a projection service at the application layer.

The window manager is configured to manage a window program. The window manager may obtain a size of a display, determine whether there is a status bar, perform screen locking, take a screenshot, and the like.

The content provider is configured to store and obtain data, and enable the data to be accessed by an application.

The data may include a video, an image, audio, calls that are made and received, a browsing history and a browsing bookmark, an address book, and the like.

The view system includes visual controls such as a control for displaying a text and a control for displaying an image. The view system may be configured to construct an application. A displayed interface may include one or more views. For example, a displayed interface including an SMS message notification icon may include a text display view and a picture display view.

The phone manager is configured to provide a communication function of the electronic device 100, for example, management of a call status (including answering, declining, or the like).

The resource manager provides various resources for an application such as a localized character string, an icon, a picture, a layout file, and a video file.

The notification manager enables an application to display notification information in a status bar, and may be configured to convey a notification message. The notification manager may automatically disappear after a short pause without requiring a user interaction. For example, the notification manager is configured to notify download completion, provide a message notification, and the like. The notification manager may alternatively be a notification that appears in a top status bar of the system in a form of a graph or a scroll bar text, for example, a notification of an application that is run on a background, or may be a notification that appears on a screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer are run on the virtual machine. The virtual machine executes Java files at the application layer and the application framework layer as binary files. The virtual machine is configured to implement functions such as object life cycle management, stack management, thread management, security and exception management, and garbage collection.

The system library may include a plurality of function modules such as a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It should be noted that, the memory in the foregoing embodiment may be a read-only memory (read-only memory, ROM) or another type of static storage device that can store static information and instructions, a random access memory (random access memory, RAM) or another type of dynamic storage device that can store information and instructions, or may be an electrically erasable programmable read-only memory (Electrically Erasable Programmable Read-Only Memory, EEPROM), a compact disc read-only memory (Compact Disc Read-Only Memory. CD-ROM) or another optical disc storage, a disc storage (including a compact disc, a laser disc, an optical disc, a digital versatile disc, a Blu-ray disc, or the like), a magnetic disk storage medium or another magnetic disk storage device, or any other medium that can be used to carry or store expected program code in an instruction or data structure form and that can be accessed by a computer, but this application is not limited thereto. The memory may exist independently, and is connected to the processor through the bus. The memory may alternatively be integrated with the processor.

The processor in the foregoing embodiment may be a general-purpose central processing unit (CPU), a microprocessor, an application-specific integrated circuit (application-specific integrated circuit, ASIC), or one or more integrated circuits for controlling program execution of the foregoing solution.

It should be noted that, to make the description brief, the foregoing method embodiments are expressed as a series of actions. However, a person skilled in the art should appreciate that this application is not limited to the described action sequence, because according to this application, some steps may be performed in other sequences or performed simultaneously. In addition, a person skilled in the art should also be aware that embodiments described in this specification are all example embodiments, and the described actions and modules are not necessarily required for this application.

In several embodiments provided in this application, it should be understood that the disclosed apparatuses may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed.

The units described as separate parts may or may not be physically separate, and parts shown as units may or may not be physical units, may be located in one place, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device, and may be specifically a processor in a computer device) to perform all or some of the steps of the methods described in embodiments of this application. The foregoing storage medium may include any medium that can store program code, such as a USB flash drive, a removable hard disk drive, a magnetic disk, an optical disc, a read-only memory (read-only memory, ROM), or a random access memory (random access memory, RAM).

In conclusion, the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent interchanges to some technical features thereof without departing from the scope of the technical solutions of embodiments of this application.

What is claimed is:

1. An interface display method performed by an electronic device, the interface display method comprising:
    displaying, using K display windows, a video call screen of K users of current video call users; and
    interchanging, in M display windows and based on a current activeness ranking of the current video call users when a quantity of user rank changes reaches L, M first users having changed ranks with second users, wherein the quantity of user rank changes is based on comparing user rank numbers of the K users with video call users that are ranked in a top K in the current activeness ranking, wherein K is an integer, wherein L is an integer less than K, wherein M is an integer less than or equal to L, and wherein a first user for interchange is ranked higher in the current activeness ranking than a corresponding interchanged second user,
    wherein the interchanging comprises:
        selecting, when N users of the video call users in the K display windows are ranked beyond the top K in the current activeness ranking and N is greater than or equal to M, M users that are ranked lower in the current activeness ranking as the second users;
        ranking the second users based on user rank numbers of the second users to obtain second rank numbers of the second users;
        selecting, from video call users that are ranked in the top K in the current activeness ranking and that do not correspond to the K display windows, M users that are ranked higher in the current activeness ranking as the M first users;
        ranking the M first users based on the current activeness ranking of the M first users to obtain first rank numbers of the M first users; and
        interchanging the M first users whose first rank numbers are the same as the second rank numbers with the second users.

2. The interface display method of claim 1, wherein before the interchanging, the interface display method further comprises:
    collecting statistics about a lasting time of a target sound intensity of each video call user within a preset duration and an average value of sound intensities of each video call user within the preset duration, wherein the target sound intensity is a sound intensity with a decibel greater than a first threshold;

ranking the lasting time and ranking the average value to obtain a rank value Rank1 and a rank value Rank2;

calculating a first rank value of each video call user within the preset duration based on the Rank1, the Rank2, a first weight value of the Rank1, and a second weight value of the Rank2;

calculating a current activeness score of each video call user based on the first rank value, a third weight value of the preset duration, a second rank value of each video call user in a historical preset duration, and a fourth weight value of the historical preset duration; and ranking current activeness scores of the video call users to obtain the current activeness ranking of the video call users.

3. The interface display method of claim 1, wherein a value of L is [Ceil (K/3), Floor (K/2], wherein Ceil (K/3) is a rounded-up integer of K/3, and wherein Floor (K/2) is a rounded-down integer of K/2.

4. The interface display method of claim 1, wherein the video call users satisfy an activeness ranking qualification, and wherein the activeness ranking qualification comprises one or more of a video call user having:
only a video stream;
only an audio stream;
both the video stream and the audio stream; or
neither the video stream nor the audio stream.

5. The interface display method of claim 1, wherein the M display windows do not comprise a locked display window.

6. The interface display method of claim 1, wherein before the interchanging the interface display method further comprises adjusting a location of a third user in the current activeness ranking, wherein the third user is, among the video call users in the K display windows, in a first state and ranked beyond the top K in the current activeness ranking, and wherein the third user is ranked in the top K in an activeness ranking after adjustment.

7. The interface display method of claim 1, wherein before the interchanging the interface display method further comprises adjusting a location of a fourth user in the current activeness ranking, wherein the fourth user is S users among video call users that are ranked beyond the top K in the current activeness ranking and that do not correspond to the display windows, that are in a second state, and that are ranked higher in the activeness ranking, wherein S is less than or equal to M, and wherein the fourth user is ranked in a top M in a current activeness ranking after adjustment.

8. The interface display method of claim 1, wherein the interchanging comprises:
setting, when all the video call users in the K display windows are ranked in the top K in the current activeness ranking, and the quantity of user rank changes reaches L, a sequence number i to 1;
selecting a first video call user with a sequence number i and a second video call user with a sequence number i respectively from a first user sequence and a second user sequence, wherein the first user sequence comprises L video call users that are ranked higher in the current activeness ranking, the second user sequence comprises L video call users whose sequence numbers are ranked higher in a user rank sequence, and the user rank sequence comprises the video call users that are in the K display windows and that have user rank numbers;
interchanging, when user rank numbers of both the first video call user and the second video call user are not changed compared with an original user rank sequence, and the first video call user is ranked higher in the current activeness ranking than the second video call user, locations of the first video call user and the second video call user in the user rank sequence to obtain an updated user rank sequence;
interchanging, when a quantity of users whose user rank numbers are changed in the updated user rank sequence is greater than or equal to L, M first users whose user rank numbers are changed in the updated user rank sequence with the second users in corresponding M display windows; and
when the quantity of users whose user rank numbers are changed in the updated user rank sequence is less than L compared with the original user rank sequence:
updating the sequence number i based on a formula i=i+1; and
selecting a first video call user with a sequence number i and a second video call user with a sequence number i respectively from a first user sequence and a second user sequence.

9. The interface display method of claim 1, wherein the interchanging comprises:
setting, when all the video call users in the K display windows are ranked in the top K in the current activeness ranking, and the quantity of user rank changes reaches L, a sequence number i to 1;
selecting a first video call user with a sequence number i and a third video call user with a sequence number i respectively from a first user sequence and a user rank sequence, wherein the first user sequence comprises L video call users that are ranked higher in the current activeness ranking, and the user rank sequence comprises the video call users that are in the K display windows and that have user rank numbers;
interchanging, when the first video call user and the third video call user are different users, locations of the first video call user and the third video call user in the user rank sequence, to obtain an updated user rank sequence;
interchanging, when a quantity of users whose user rank numbers are changed in the updated user rank sequence is greater than or equal to L, M first users whose user rank numbers are changed in the updated user rank sequence with the second users in the corresponding M display windows; and
when the quantity of users whose user rank numbers are changed in the updated user rank sequence is less than L compared with an original user rank sequence, and the sequence number i is less than L:
updating the sequence number i based on a formula i=i+1, and
selecting a first video call user with a sequence number i and a third video call user with a sequence number i respectively from a first user sequence and a user rank sequence.

10. The interface display method of claim 8, wherein the first video call user and the second video call user do not comprise a video call user that is in a display window and that is in a third state.

11. The interface display method of claim 9, wherein the first video call user and the third video call user do not comprise a video call user that is in a display window and that is in a third state.

12. An electronic device, comprising:
a touchscreen configured to display content; and
one or more processors coupled to the touchscreen and configured to cause the electronic device to:

display, using the touchscreen and K display windows, a video call screen of K users of current video call users; and interchange, in M display windows and based on a current activeness ranking of the current video call users when a quantity of user rank changes reaches L, M first users having changed ranks with second users, wherein the quantity of user rank changes is based on comparing user rank numbers of the K video call users with video call users that are ranked in a top K in the current activeness ranking, wherein K is an integer, wherein L is an integer less than K, wherein M is an integer less than or equal to L, and wherein a first user for interchange is ranked higher in the current activeness ranking than a corresponding interchanged second user, wherein the interchanging comprises:
  selecting, when N users of the video call users in the K display windows are ranked beyond the top K in the current activeness ranking and N is greater than or equal to M, and from the N users, M users that are ranked lower in the current activeness ranking as the second users;
  ranking the second users based on user rank numbers of the second users to obtain second rank numbers of the second users;
  selecting, from video call users that are ranked in the top K in the current activeness ranking and that do not correspond to the K display windows, M users that are ranked higher in the current activeness ranking as the M first users;
  ranking the M first users based on the current activeness ranking of the M first users to obtain first rank numbers of the M first users; and
  interchanging the M first users whose first rank numbers are the same as the second rank numbers with the second users.

13. The electronic device of claim 12, wherein before the interchanging the one or more processors are further configured to cause the electronic device to:
  collect statistics about a lasting time of a target sound intensity of each video call user within a preset duration and an average value of sound intensities of each video call user within the preset duration, wherein the target sound intensity is a sound intensity with a decibel greater than a first threshold;
  rank the lasting time and the average value to obtain a rank value Rank1 and a rank value Rank2;
  calculate a first rank value of each video call user within the preset duration based on the Rank1, the Rank2, a weight value of the Rank1, and a weight value of the Rank2;
  calculate a current activeness score of each video call user based on the first rank value, a first weight value of the preset duration, a second rank value of each video call user in a historical preset duration, and a second weight value of the historical preset duration; and
  rank current activeness scores of the video call users to obtain the current activeness ranking of the video call users.

14. The electronic device of claim 12, wherein a value of L is [Ceil (K/3), Floor (K/2)], wherein Ceil (K/3) is a rounded-up integer of K/3, and wherein Floor (K/2) is a rounded-down integer of K/2.

15. The electronic device of claim 12, wherein the video call users satisfy an activeness ranking qualification, and wherein the activeness ranking qualification comprises one or more of a video call user having:
  only a video stream;
  only an audio stream;
  both the video stream and the audio stream; or
  neither the video stream nor the audio stream.

16. The electronic device of claim 12, wherein the M display windows do not comprise a locked display window.

17. The electronic device of claim 12, wherein before the interchanging, the one or more processors are further configured to cause the electronic device to adjust a location of a third user in the current activeness ranking, wherein the third user is a user among the video call users in the K display windows that is in a first state and that is ranked beyond the top K in the current activeness ranking, and wherein the third user is ranked in the top K in an activeness ranking after adjustment.

18. The electronic device of claim 12, wherein before the interchanging, the one or more processors are further configured to cause the electronic device to adjust a location of a fourth user in the current activeness ranking, wherein the fourth user is, among video call users that are ranked beyond the top K in the current activeness ranking and that do not correspond to the display windows, in a second state and ranked higher in the activeness ranking, wherein S is less than or equal to M, and wherein the fourth user is ranked in a top M in a current activeness ranking after adjustment.

19. The electronic device of claim 12, wherein the interchanging comprises:
  setting, when all the video call users in the K display windows are ranked in the top K in the current activeness ranking, and the quantity of user rank changes reaches L, a sequence number i to 1;
  selecting a first video call user with a sequence number i and a third video call user with a sequence number i respectively from a first user sequence and a user rank sequence, wherein the first user sequence comprises L video call users that are ranked higher in the current activeness ranking, and when the user rank sequence comprises the video call users that are in the K display windows and that have user rank numbers;
  interchanging, when the first video call user and the third video call user are different users, locations of the first video call user and the third video call user in the user rank sequence to obtain an updated user rank sequence;
  interchanging, when a quantity of users whose user rank numbers are changed in the updated user rank sequence is greater than or equal to L, M first users whose user rank numbers are changed in the updated user rank sequence with the second users in corresponding M display windows; and
  when the quantity of users whose user rank numbers are changed in the updated user rank sequence is less than L compared with an original user rank sequence, and the sequence number i is less than L:
    updating the sequence number i based on a formula i=i+1, and
    selecting a first video call user with a sequence number i and a third video call user with a sequence number i respectively from a first user sequence and a user rank sequence.

20. A computer program product comprising instructions that are stored on a computer-readable medium and that, when executed by a processor, cause an electronic device to:
  display, using the touchscreen and K display windows, a video call screen of K users of current video call users; and interchange, in M display windows and based on a current activeness ranking of the current video call users when a quantity of user rank changes reaches L, M first users having changed ranks with second users, wherein the quantity of user rank changes is based on comparing user rank numbers of the K video call users with video call users that are ranked in a top K in the current activeness ranking, wherein K is an integer, wherein L is an integer less than K, wherein M is an integer less than or equal to L, and wherein a first user for interchange is ranked higher in the current activeness ranking than a corresponding interchanged second user, wherein the interchanging comprises:

selecting, when N users of the video call users in the K display windows are ranked beyond the top K in the current activeness ranking and N is greater than or equal to M, and from the N users, M users that are ranked lower in the current activeness ranking as the second users;

ranking the second users based on user rank numbers of the second users to obtain second rank numbers of the second users;

selecting, from video call users that are ranked in the top K in the current activeness ranking and that do not correspond to the K display windows, M users that are ranked higher in the current activeness ranking as the M first users;

ranking the M first users based on the current activeness ranking of the M first users to obtain first rank numbers of the M first users; and interchanging the M first users whose first rank numbers are the same as the second rank numbers with the second users.

* * * * *